(12) United States Patent
Raj et al.

(10) Patent No.: US 12,730,216 B2
(45) Date of Patent: Sep. 8, 2026

(54) BISTATIC ISAR SYNCHRONIZATION USING DIRECT PATH SIGNAL

(71) Applicant: The Government of the United States of America, as represented by the Secretary of the Navy, Arlington, VA (US)

(72) Inventors: Raghu Raj, Washington, DC (US); Ronald Lipps, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 277 days.

(21) Appl. No.: 18/375,981

(22) Filed: Oct. 2, 2023

(65) Prior Publication Data

US 2024/0125922 A1 Apr. 18, 2024

Related U.S. Application Data

(60) Provisional application No. 63/412,310, filed on Sep. 30, 2022.

(51) Int. Cl.
*G01S 13/90* (2006.01)

(52) U.S. Cl.
CPC ...... *G01S 13/9064* (2019.05); *G01S 13/9058* (2019.05); *G01S 13/9004* (2019.05); *G01S 13/9019* (2019.05)

(58) Field of Classification Search
CPC ............... G01S 13/9064; G01S 13/958; G01S 13/9019; G01S 13/90; G01S 13/9004
USPC ..................... 342/25 R, 25 A, 25 B, 25 F, 89
See application file for complete search history.

(56) References Cited

U.S. PATENT DOCUMENTS

| | | | | |
|---|---|---|---|---|
| 4,370,656 A * | 1/1983 | Frazier | G01S 13/003 | 342/126 |
| 5,113,193 A * | 5/1992 | Powell | G01S 13/003 | 342/25 F |
| 6,608,584 B1 * | 8/2003 | Faulkner | G01S 13/003 | 342/149 |
| 7,038,618 B2 * | 5/2006 | Budic | G01S 13/003 | 342/159 |
| 7,148,839 B2 * | 12/2006 | Chen | G01S 13/003 | 342/134 |

(Continued)

FOREIGN PATENT DOCUMENTS

| | | | |
|---|---|---|---|
| CN | 104166140 A * | 11/2014 | G01S 13/904 |
| CN | 110632597 A * | 12/2019 | G01S 13/90 |

(Continued)

*Primary Examiner* — Chuong P Nguyen
(74) *Attorney, Agent, or Firm* — US Naval Research Laboratory; William P. Ladd

(57) ABSTRACT

Systems and methods are provided for synchronizing a bistatic inverse synthetic aperture radar (ISAR) imaging radar system using only the signal that travels directly between the transmitter and receiver. In an embodiment, an extracted direct path signal is used as a matched filter reference function. In an embodiment, full pulse compression is used for a matched filter implementation. Embodiments of the present disclosure provide systems and methods for detecting and extracting the direct path signal and using this direct path signal to synchronize the received signal stream in a bistatic ISAR system.

20 Claims, 20 Drawing Sheets

(56) References Cited

U.S. PATENT DOCUMENTS

| | | | | |
|---|---|---|---|---|
| 7,333,049 | B2 * | 2/2008 | Krikorian | G01S 13/52 342/126 |
| 8,487,808 | B2 * | 7/2013 | Boufounos | G06V 20/13 342/25 R |
| 9,057,605 | B2 * | 6/2015 | Halmos | G01S 7/4814 |
| 9,335,409 | B2 * | 5/2016 | Abatzoglou | G01S 7/2955 |
| 11,719,786 | B2 * | 8/2023 | Ranney | G01S 13/003 342/189 |

FOREIGN PATENT DOCUMENTS

| | | | | |
|---|---|---|---|---|
| EP | 3865908 | A1 * | 8/2021 | G01S 7/41 |
| KR | 101052050 | B1 * | 7/2011 | G01S 13/033 |
| WO | WO-2026023415 | A1 * | 1/2026 | B64G 3/00 |

* cited by examiner

1002

Bistatic ISAR imaging With Synchronization

Bistatic ISAR imaging Without Synchronization

BISTATIC ISAR SYNCHRONIZATION USING DIRECT PATH SIGNAL

CROSS REFERENCE TO RELATED APPLICATIONS

This application claims the benefit of U.S. Provisional Patent Application No. 63/412310, filed on Sep. 30, 2022, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, DC 20375, USA; +1.202.767.7230; techtran@nrl.navy.mil, referencing Navy Case Number 111916-US2.

FIELD OF THE DISCLOSURE

This disclosure relates to radar systems, including inverse synthetic-aperture radar (ISAR) systems.

BACKGROUND

Inverse synthetic aperture radar (ISAR) imaging involves a (either a stationary or moving) radar illuminating moving targets (generally involving accelerated motion) and using the targets' motion to form imagery. The formed ISAR imagery is invaluable in target identification applications. Conventional monostatic ISAR processing uses the data collected from a coherent radar and performs range-Doppler processing to obtain the desired image. The range resolution of the radar image is directly related to the bandwidth of the transmitted radar signal, and the cross-range resolution is obtained from the Doppler frequency differentiation generated by the target rotation relative to the radar line-of-sight (LOS). In Monostatic operation, a single system performs both the transmission and reception of the RF signal that is used to form the ISAR imagery. Embodiments of the present disclosure provide systems and methods for ISAR synchronization that improve upon the capabilities of conventional ISAR systems.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
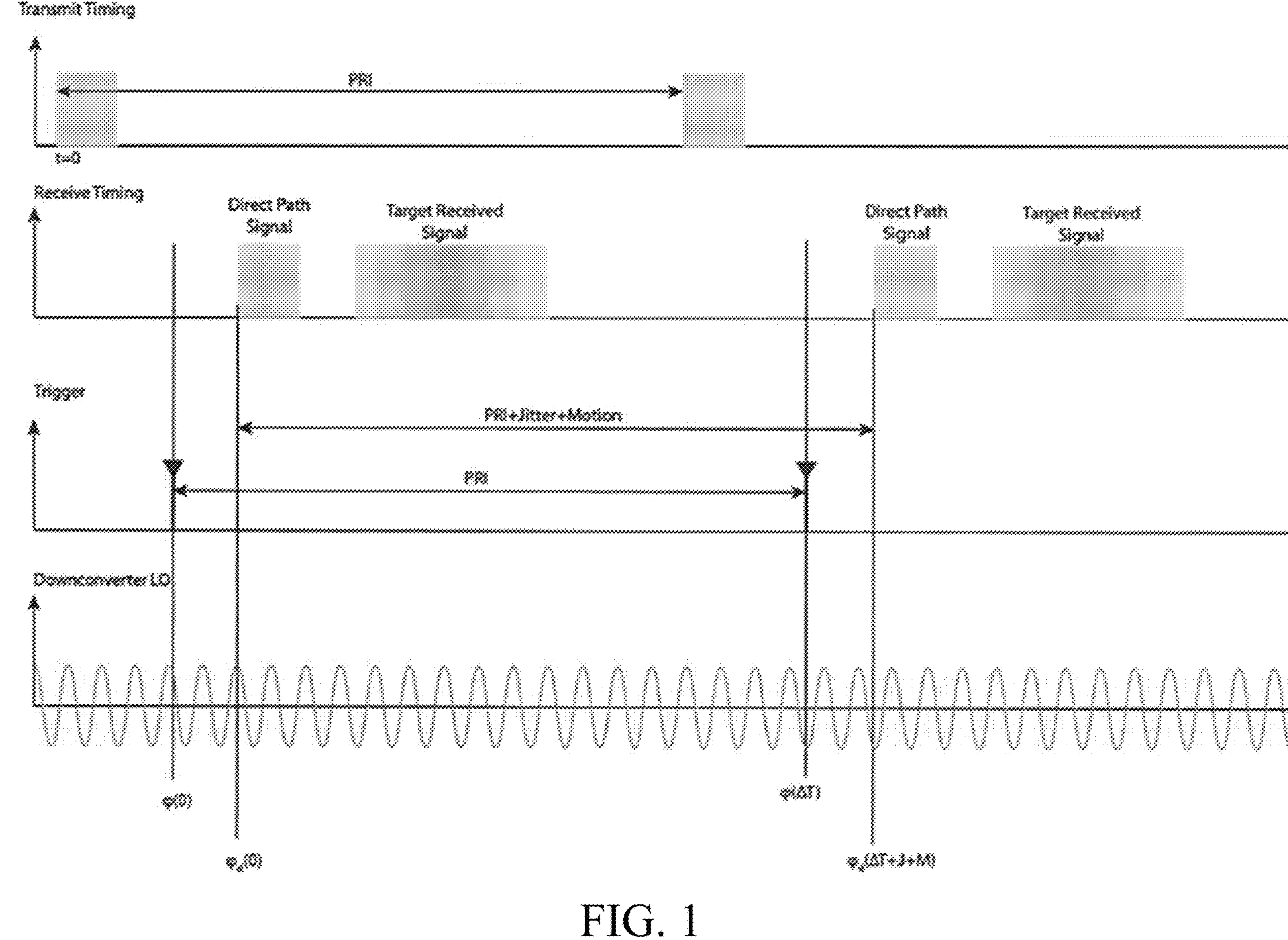
FIG. 1 is a diagram that shows a timeline for the transmit and receive portions of a bistatic radar system in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

In an ISAR embodiment of the present disclosure, the transmitter and receiver are on separate platforms so there is no inherent synchronization between the transmission of the radio frequency (RF) signal and the reception of the scattered energy from the target. This asynchronous operation presents a challenge when trying to perform the coherent processing needed to form the bistatic ISAR imagery. Embodiments of the present disclosure provide techniques for performing the synchronization between the bistatic transmitter and bistatic receiver using the transmitted energy that travels directly from the transmitter to the receiver (direct path signal).

In an embodiment, since there is no coordinated synchronization (e.g., scripted transmission with GPS synchronized clocks or direct connection between transmitter and receiver), the received signal should somehow be synchronized, in both timing and phase, with the transmitted waveform. In an embodiment, a method for achieving this synchronization is to use the direct path signal from the transmitter to the receiver for the timing and phase baseline. Once this has been achieved, a system in accordance with an embodiment of the present disclosure can operate in a 'quasi-monostatic' mode, and traditional ISAR processing techniques can be applied to form the imagery.

Embodiments of the present disclosure provide systems and methods for synchronizing a bistatic inverse synthetic aperture radar (ISAR) imaging radar system using only the signal that travels directly between the transmitter and receiver. In an embodiment, an extracted direct path signal is used as a matched filter reference function. In an embodiment, full pulse compression is used for a matched filter implementation. Embodiments of the present disclosure provide systems and methods for detecting and extracting the direct path signal and using this direct path signal to synchronize the received signal stream in a bistatic ISAR system.

2. Exemplary System Model

In an embodiment, for bistatic imaging radar, the transmitter and receiver are assumed to be on separate platforms at two separate locations, each with its own independent motion. When the transmitter emits its waveform, some of the energy travels directly to the receiver, and some of the energy travels to the target, reflects off the target, and travels to the receiver. In an embodiment, because the direct path signal always arrives at the receiver before the signal reflected off the target, it can be used as a synchronization signal to set the timing of the receiver and can be used as a phase reference for coherent processing.

FIG. 1 is a diagram that shows a timeline for the transmit and receive portions of a bistatic radar system in accordance with an embodiment of the present disclosure. In an embodiment, the receiver does not know when the transmitter emits its signal, but it continuously records incoming signal until it observes the transmit waveform, and when it does, it uses this time of arrival as a timing baseline. In an embodiment, the first detected direct path signal sets the time baseline for the synchronization system (e.g., $T_R(0)$). In an embodiment, because the receiver knows the pulse repetition interval (PRI) of the transmitter, the receiver can use this knowledge to set up a "trigger" to look for the direct path signal for the next pulse sent by the transmitter. In an embodiment, the trigger time is equivalent to the transmit time in a monostatic radar system and can be either be a true trigger that initiates the recording of the received signal or can act as a locator in the continuously recorded data stream that lets the system know when to start looking for the reception of the next pulse.

In an embodiment, due to the independent motion of the transmitter and receiver and differences in the frequency in the local oscillators that are used for time reference, there are errors in the direction of the arrival of the next pulse. Because of these errors, the trigger time can be set slightly before the expected time for the receipt of the direct path signal. In an embodiment, the time between the trigger time (set from the previous pulse) and when the direct path signal actually arrives at the receiver is equivalent to a timing jitter in the system (AT). In an embodiment, because the receiver uses a free running stable oscillator for the phase reference, the equivalent timing jitter causes a phase error in the unsynchronized received signal. The term unsynchronized received signal refers to the received signal using the trigger as the timing and phase reference.

2.1 Direct Path Signal

In an embodiment, assume the transmitter sends out a waveform at global time t=0 defined as:

$$s_T = w(t)e^{-j2\pi f_0} \tag{1}$$

where w(t) is the baseband waveform and $f_0$ is the RF center frequency. In an embodiment, the direct path bistatic received signal is:

$$s_R(t) = aw\left(t - \frac{R_D(t)}{c}\right)e^{-j2\pi f_0\left(t - \frac{R_d}{c}\right)} \quad (2)$$

where $R_D$ (t) is the range from the transmitter to the receiver, c is the speed of light, and a is the amplitude scaling constant (determined by the link budget between the transmitter and receiver). In an embodiment, the downconverted signal (using the receiver's local oscillator at frequency $f_R$) is:

$$s_{RB}(t) = aw\left(t - \frac{R_D(t)}{c}\right)e^{-j2\pi f_0\left(t - \frac{R_d}{c}\right)}e^{j2\pi f_R\left(t - \frac{R_d}{c}\right) + \varphi_d(0)} \quad (3)$$

$$s_{RB}(t) = aw\left(t - \frac{R_D(t)}{c}\right)e^{-j2\pi(f_0 - f_R)\left(t - \frac{R_d}{c}\right) + \varphi_d(0)} \quad (4)$$

where $\varphi_d(0)$ is the local oscillator phase when the direct path signal arrives at the receiver. In an embodiment, the term ($f_0$-$f_R$) is the frequency error and offsets the center of the downconverted signal from DC by the frequency error.

In an embodiment, because low phase noise stable oscillators are used for both the transmitter and receiver (required for coherent operation), the frequency error is constant over the image formation period, and the effect of the frequency error is negligible. If we substitute the continuous time transmitter-to-receiver range with a discrete range (range at the time of transmission) $R_{D,n}$ and define the modulation due to the frequency error as follows:

$$\varepsilon_f(t) = e^{-j2\pi(f_0 - f_R)\left(t - \frac{R_d}{c}\right)} \quad (5)$$

the downconverted signal is:

$$s_{RB}(t) = a\varepsilon_f(t)w\left(t - \frac{R_d(n)}{c}\right)e^{-j\varphi_d(0)} \quad (6)$$

If the received signal is pulse compressed ($S_{RC}$) by match filtering with a replica of the transmitted signal, the resulting signal is:

$$s_{RC}(t) = a\varepsilon_f(t)w\left(t - \frac{R_d(n)}{c}\right)e^{-j\varphi_d(0)} \otimes w^*(t) \quad (7)$$

$$s_{RC}(t) = a'\varepsilon_f(t)\delta\left(t - \frac{R_d(n)}{c}\right)e^{-j\varphi_d(0)} \otimes H(t) \quad (8)$$

which is an impulse that occurs at the time the direct path signal is received with the phase the same as the local oscillator at that time and convolved with the impulse response of the transmitted waveform (H(t)). The term a' is the received amplitude scaled by the processing gain.

In an embodiment, when the impulse is detected, a new receiver timing baseline is set ($t'=T_R(0)$), and the synchronization of the reception of subsequent transmitted pulses are based on the new baseline. At this point we now have two time references: the time reference at the transmitter (t) and the time reference at the receiver (t'). In an embodiment, the goal of synchronization is to align these two timelines.

In an embodiment, if we assume that the transmitter emits a pulse at a regular interval ($\Delta T$), we can estimate when the next transmitted waveform will arrive at the receiver. In an embodiment, first we define a time interval ($\Delta T_{PRE}$) to be the difference between when we expect the transmitted pulse to arrive and when we set the trigger. If we assume that the trigger is set by counting cycles from the stable clock instead of an external signal (where the rise time of the signal can introduce jitter), we can assume that the jitter between triggers is negligible. In an embodiment, the next step is to determine the time the direct path signal arrives at receiver from the pulse that is transmitted after the pulse that set the timing baseline. In an embodiment, from the transmitter timeline, the next pulse is transmitted at time $t=\Delta T$ and received at time:

$$t_{R,1} = \Delta T + \frac{R_d(1)}{c} \quad (9)$$

In an embodiment, the receiver time baseline was set by the detection of the direct path signal from the previous pulse and is given as:

$$T_R(0) = \frac{R_D(0)}{c} \Rightarrow t' = 0 \quad (10)$$

$$t' = t - \frac{R_D(0)}{c} \quad (11)$$

In an embodiment, the second pulse arrives at the receiver in the receiver's time reference at time:

$$t'_{R,1} = \Delta T + \frac{R_D(1)}{c} - \frac{R_D(0)}{c} \quad (12)$$

$$t'_{R,1} = \Delta T + \frac{(R_D(1) - R_D(0))}{c} \quad (13)$$

In an embodiment, the change in the expected direct path arrival time (which should be $\Delta T$) is change in range between the transmitter and receiver. If we look forward to the Nth pulse beyond the original baseline pulse and represent the change in range between the transmitter and receiver by $\Delta R_{D,n}=(R_{D,N}-R_{D,N-1})$, the time the Nth pulse arrives at the receiver is:

$$t'_{R,N} = N\Delta T + \frac{(R_D(N) - R_D(0))}{c} = N\Delta T + \Sigma_{i=1}^{N}\frac{\Delta R_D(i)}{c} \quad (14)$$

which is the expected arrival time ($N\Delta T$) plus the accumulated range changes between the transmitter and the receiver. In an embodiment, the received and pulse compressed signal stream due only to the direct path signal substituting Eqn X into Eqn Y is:

$$s_{RC}(t') = a\varepsilon_f(t)\Sigma_{i=1}^{N}\delta\left(t' - t'_{R,n}\right)e^{-j\varphi_d\left(t'_{R,n}\right)} \otimes H(t') \quad (15)$$

which is a series of impulses that occur at the times when the direct path signal arrives, convolved with the transmit waveform impulse response functions. By detecting these impulses, we can then measure the changes in the range between transmitter and the receiver for all of the pulses. In an embodiment, the phase angle at the impulse directly measures the phase offset due to the changing range between the transmitter and the receiver, which can be removed.

By representing the direct path signal arrival time as an accumulation of differential range changes from pulse to pulse, we can consider performing synchronization on a pulse-by-pulse bases and establishing a new time reference for each pulse with the offset between the time reference of a pulse and the previous pulse being relative to the measured differential range ($\Delta R_D(i)$). The new time reference is given as:

$$t''_{R,N} = t'_{R,N-1} - \Delta T - \frac{\Delta R_D(n)}{c} \tag{16}$$

In an embodiment, this is a iterative process where for each pulse, the time reference is updated ($t''_{R,n} \Rightarrow t'_{R,n}$) after each iteration. In an embodiment, this pulse-centric time reference is equivalent to "fast-time" variable in a monostatic radar and is given as:

$$\tau_n = \tau_{n-1} - \Delta T - \frac{\Delta R_D(n)}{c} \tag{17}$$

In an embodiment, because the direct path signal arrives at the receiver at a time $$\Delta T + \frac{\Delta R_D(n)}{c}$$

relative to the arrival of the previous C pulse, the impulse due to the direct path signal always arrives at $\tau_n=0$. In an embodiment, at this point, the bistatic receiver is synchronized to the arrival of the direct path signal.

2.2 Received Signal from a Scatterer

In an embodiment, this is important because if we look at the signal that is received from the scattering from a scatterer by the first pulse at a range from the transmitter RT(t) and a range from the receiver RR(t), the time this signal arrives at the receiver is:

$$t_s = \frac{R_T(t) + R_R(t)}{c} \tag{18}$$

If we reference this to the receiver's reference time, the signal arrives at time:

$$t'_s = \frac{R_T(t) + R_R(t)}{c} - \frac{R_D(0)}{c} \tag{19}$$

In an embodiment, the term $R_T(t)+R_{R\ (t)}$ is the bistatic range, and if we replace this term by the bistatic range at pulse n (time $t=\Delta n$) by $R_B(n)$, the time that the scattered signal from pulse n arrived at the receiver is:

$$t'_{S,n} = n\Delta T + \frac{R_B(n)}{c} - \frac{R_D(0)}{c} \tag{20}$$

The bistatic range can be represented as an accumulation of differential bistatic range changes (similar to representation of the transmitter-to-receiver range) and is given as:

$$R_B(n) = R_B(0) + \Sigma_{i=0}^{n} \Delta R_B(i) \tag{21}$$

where $$\Delta R_B(i) = R_B(i) - R_B(i-1) \tag{22}$$

The arrival time for the scattered signal becomes:

$$t'_{S,N} = N\Delta T + \frac{R_B(0) - R_D(0)}{c} + \Sigma_{i=0}^{N} \frac{\Delta R_B(i)}{c} \tag{23}$$

In an embodiment, if we compare the arrival time of the signal from the scatterer to direct path signal, we can determine the scatterer signal arrival time in the pulse-centric ($\tau_n$) time reference.

$$\tau_{S,N} = \Delta t'_N = \Delta t'_{S,N} - \Delta t'_{R,N} = \Sigma_{i=0}^{N} \frac{\Delta R_B(i)}{c} - \Sigma_{i=1}^{N} \frac{\Delta R_D(i)}{c} = \Sigma_{i=1}^{N} \frac{\Delta R_B(i) - \Delta R_D(i)}{c} \tag{24}$$

In an embodiment, this shows that the effective bistatic path length, for synchronized pulse-centric operation, is reduced by the range from the transmitter to the receiver. The change in the pulse centric arrival time of the scatterer signal from pulse-to-pulse, which is an important consideration for range alignment and autofocus in ISAR, is $$\delta\tau_{S,N} = \tau_{S,N} - \tau_{S,N-1} = \frac{\Delta R_B(N) - \Delta R_D(N)}{c} \tag{25}$$

In an embodiment, the effect of bistatic synchronization on the received signals from a target (made up of a collection of scatterers) is that the observed effective motion of the target includes the change in the bistatic range (due to transmitter, receiver, and target motion) and the change in the range between the transmitter and receiver. In an embodiment, this can increase the complexity of the target motion, but it is necessary to have a time synchronized and phase coherent system.

2.3 Monostatic Equivalent Operation

Figure 2:
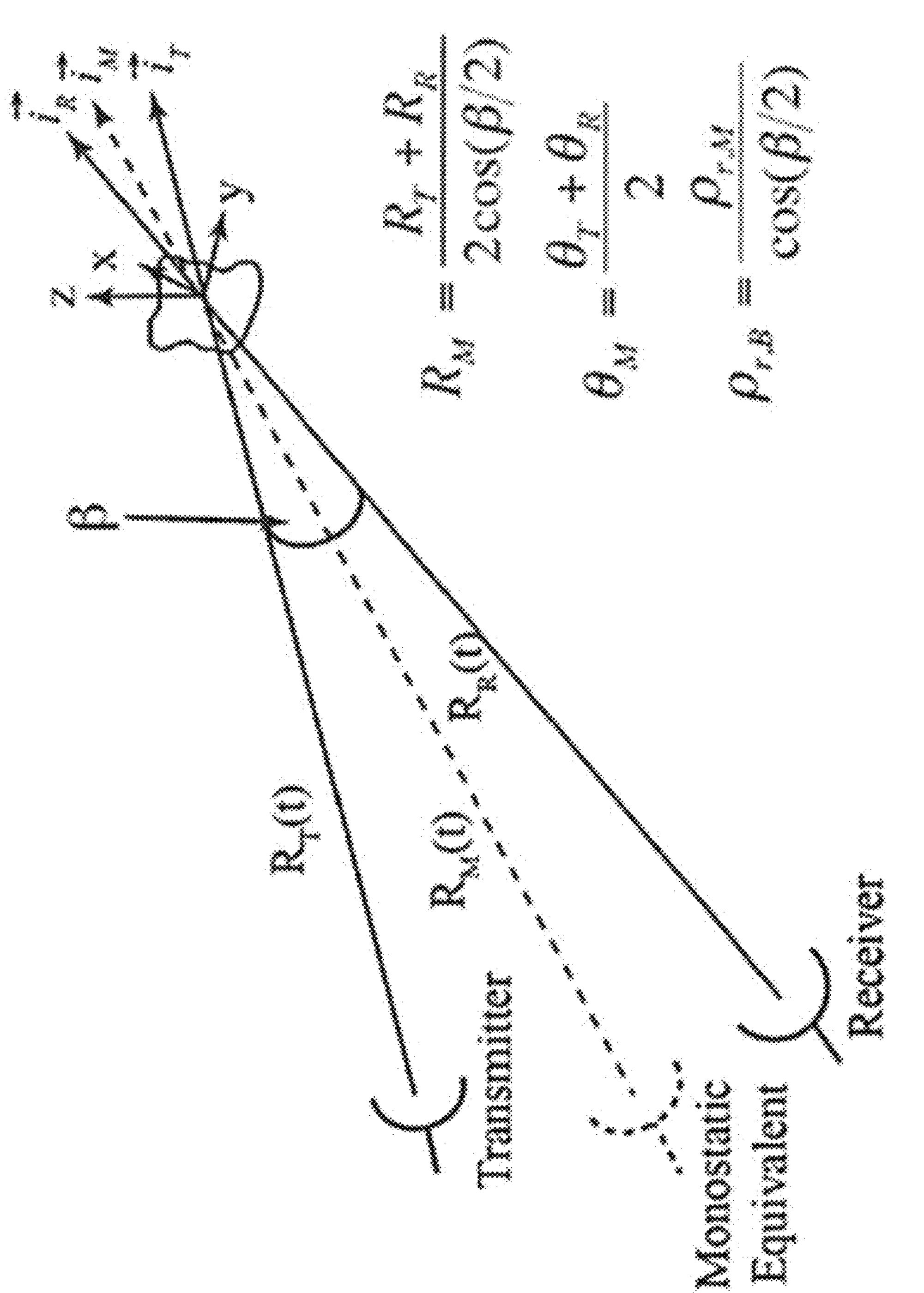
FIG. 2 is a diagram that shows bistatic geometry and the details of the resulting monostatic equivalent geometry details in accordance with an embodiment of the present disclosure.

In this section, we will briefly discuss how the synchronization fits into the bistatic ISAR imaging process. To simplify the analysis and to use methodologies employed in traditional ISAR processing, the bistatic geometry can be transformed into a monostatic equivalent. FIG. 2 is a diagram that shows bistatic geometry and the details of the resulting monostatic equivalent geometry details in accordance with an embodiment of the present disclosure. In FIG. 2, the monostatic angle is at the bistatic bisector, and the range is the average of the transmitter and receiver ranges scaled by the inverse of the cosine of the bistatic angle.

Since ISAR motion compensation corrects for the time varying translational motion, an important factor in the monostatic equivalent equations is the range term. The time varying equivalent monostatic range can be given by letting $R_T(t)$ be the instantaneous range of the target from the transmitter, $R_R(t)$ the instantaneous range of the target from the receiver, and $R_M(t)$ be the range to the monostatic equivalent radar. In an embodiment, in the special case of a mono-static radar, these three quantities will be equal. The angle β subtended by the 2 radars, as shown in FIG. 2, is called the bistatic angle. Given this, it can be shown that the time varying equivalent monostatic range is given by:

$$r(t) = \frac{R_T(t) + R_R(t)}{2\cos(\beta(t)/2)} \tag{26}$$

Furthermore the relationship between the resolution provided by the transmitted waveform and monostatic equivalent range resolution ($\rho_r$ and $\rho_{r,M}$ respectively) and the relationship between the bistatic transmitter and receiver aspect angles ($\theta_T$ and $\theta_R$ respectively) and the monostatic equivalent aspect angle ($\theta_M$) are given as follows:

$$\rho_{r,M}(t) = \frac{\rho_r}{\cos(\beta(t)/2)} \tag{27}$$

$$\theta_M(t) = \frac{\theta_R(t) + \theta_T(t)}{2} \tag{28}$$

In an embodiment, both monostatic equivalent range resolution and aspect angle vary over time due to bistatic geometry changes caused by the motion of the transmitter, receiver, and target. The change in the monostatic equivalent range resolution is generally negligible during the time interval needed to form an image (e.g., a 5% change in range resolution due to a 5° bistatic angle change with an initial bistatic angle of 90°). The time varying change in monostatic equivalent aspect adds to the rotational motion of the target. The time varying changes in the monostatic equivalent range resolution and aspect angle do not cause significant issues with motion compensation and the main source of motion error is the time varying change in the monostatic equivalent range.

In this analysis, the synchronization of the received signal to the transmitted waveform is done with the direct path signal, which sets the timing baseline and the reference phase for the coherent processing. Once the receiver is synchronized with the transmitter, the system operates in a quasi-monostatic mode. In an embodiment, because the synchronization is done using the direct path signal, the propagation delay due to the distance between the transmitter and receiver should be considered in the calculation of the monostatic equivalent geometry.

Figure 3:
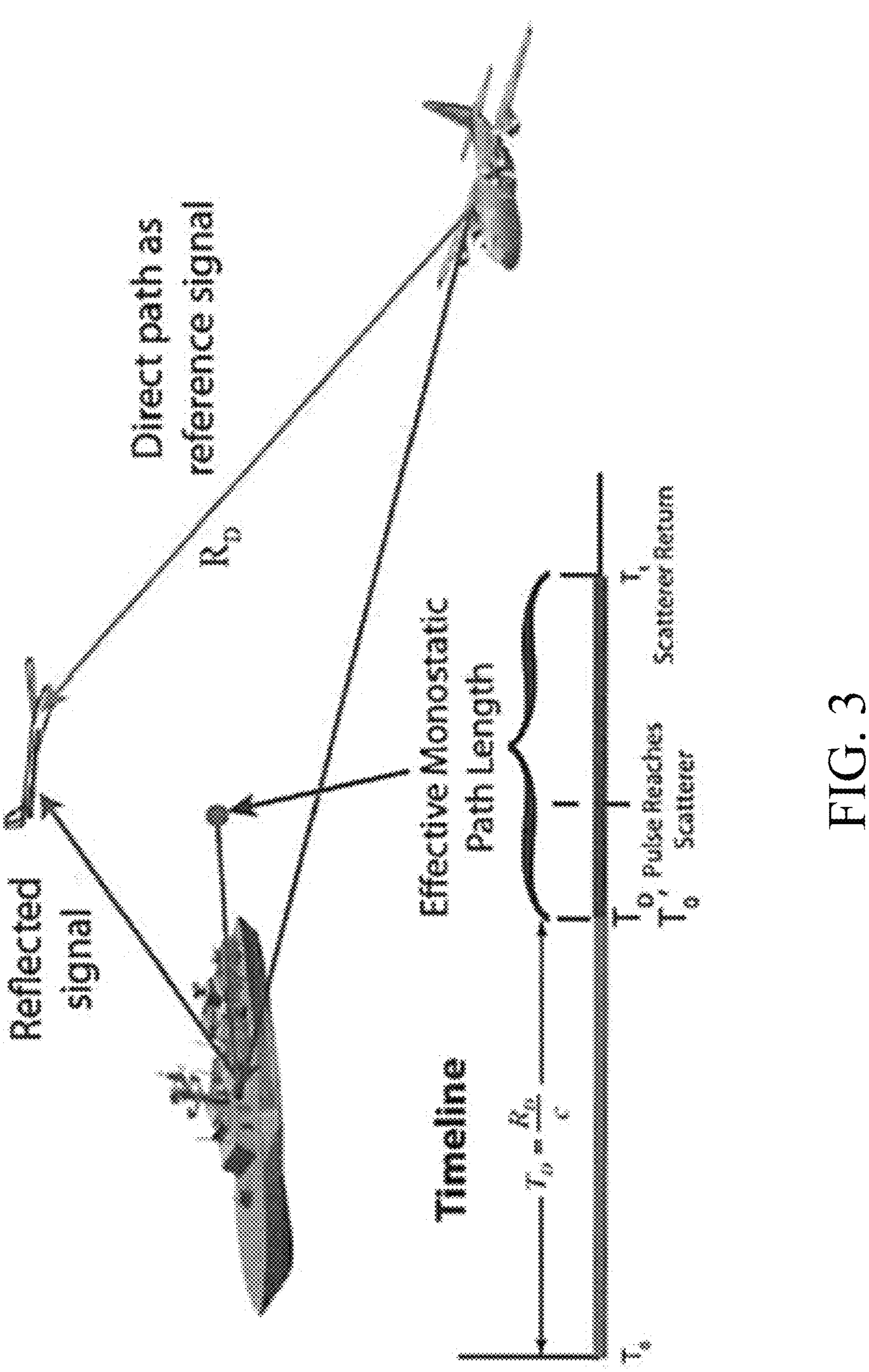
FIG. 3 is a diagram illustrating direct path synchronization geometry showing the details of the effective path length determination in accordance with an embodiment of the present disclosure.

FIG. 3 is a diagram illustrating direct path synchronization geometry showing the details of the effective path length determination in accordance with an embodiment of the present disclosure. In FIG. 3, the monostatic range is reduced by the path length between the transmitter and receiver. The adjusted equivalent monostatic range for the synchronized bistatic system is:

$$r(t) = \frac{R_T(t) + R_R(t) - R_D(t)}{2\cos(\beta(t)/2)} \tag{29}$$

The received signal after down-conversion and pulse compression at range r and pulse n due to target scatterers with a scattering coefficient a, and located at range r can be given by:

$$s_n(r) = \Sigma_{i=1}^{N} a_i \delta(r - r_i) e^{-j4\pi(f_0/c)r_i} \tag{30}$$

If we replace the range to the scatterer by the equivalent monostatic range from the radar to the centroid of the target $r_0$ plus the differential range from the scatterer to the centroid $\Delta r_i$, the received signal is now given as follows:

$$s_n(r) = \Sigma_{i=1}^{N} a_i \delta(r - r_0 - \Delta r_i) e^{-j4\pi(f_0/c)(r_0+\Delta r)} \tag{31}$$

since the monostatic range from the radar to the centroid of the target changes over time $$r_0 \Rightarrow r_0(n) \tag{32}$$

The resulting representation of the received signal is given as:

$$s_n(r) = \Sigma_{i=1}^{N} a_i \delta(r - r_0(n) - \Delta r_i) e^{-j4\pi(f_0/c)(r_0(n)+\Delta r)} \tag{33}$$

The term $\delta(r-r_0(n)-\Delta r_i)$ represents a shift in the range profile of the data and is corrected through the range alignment process. The term $e^{-j4\pi(f_0/c)(r_0(n)+\Delta r)}$ represents a phase error in the data and is corrected by the autofocus (phase error compensation) process. One thing to note in the development of the range shift estimation is that the range alignment process is on the size of the range bin size (proportional to the sampling rate) and the phase error process is done on the scale of the RF carrier wavelength (proportional to the RF frequency).

3. Direct Path Signal Detection

Embodiments of the present disclosure provide systems and methods for detecting a direct path signal in a technique for bistatic synchronization. In an embodiment, this involves the process of correlating the signal with the transmitted waveform reference and then accurately estimating the location of the correlation peak in the signal stream. In an embodiment, two important considerations in in this process are the choice of reference used in the correlation and the process used to compute the match filtering. These two topics will be discussed in this section.

3.1. Correlation Reference Selection

The selection of the reference signal has a significant impact on the performance on locating the direct path signal but in the pulse compression of the signatures from the target, which affects resolution and signal to noise ratio if the imagery. The choices for the reference that were evaluated and presented in this paper are an idealized representation of the transmitted waveform, the idealized representation with spectral shaping based on measurements, and the actual measured direct path signature from a previous pulse. The performance of each selection as well as implementation considerations will now be presented The following analysis will use the characteristics and the measured data using the NRL Multi-Channel Synthetic Aperture Radar (MSAR) system as the illuminator. The MSAR is an airborne radar system that operates at Xband with a center frequency of 9.875 GHz and uses linear FM chirped waveforms with a bandwidth of 220 MHz to achieve a range resolution of about 0.7 m. The peak radiated power is 1.4 kW and the aggregate pulse repetition frequency (PRF) of 25 kHz and pulse length of 6 μs produce an average power of 210 W.

3.2. Idealized Representation

In an embodiment, an idealized representation uses the mathematical formula for the transmitted waveform to produce the data used as the reference for direct path signal detection and pulse compression. In an embodiment, a waveform for high resolution radar imaging is the Linear Frequency Modulated (LFM) chirp waveform. The mathematical representation of the chirp can be given by:

$$w(t) = e^{-j2\pi(f_0 t + (\beta t^2/2))} \tag{34}$$

In an embodiment, for real signals the representation is:

$$w(t) = \sin(2\pi)\big(f_0(t) + (\beta t^2/2)\big) \tag{35}$$

An advantage of using the mathematical representation is that it does not need measured data from the transmitter to work, but rather only the parameters of the waveform. For the LFM chirp, the only parameters that are needed are the RF center frequency (f0) and the chirp rate (β) to generate the reference. A problem is that the reference does not account for changes in the waveform due to noise, system frequency response, other nonlinear effects that can modulate the waveform, or propagation effects. In an embodiment, when the transmitting system is able to reproduce the desired waveform with high fidelity and the only significant contribution to changes in the waveform is noise, using the idealized waveform performs very well.

Figure 4:
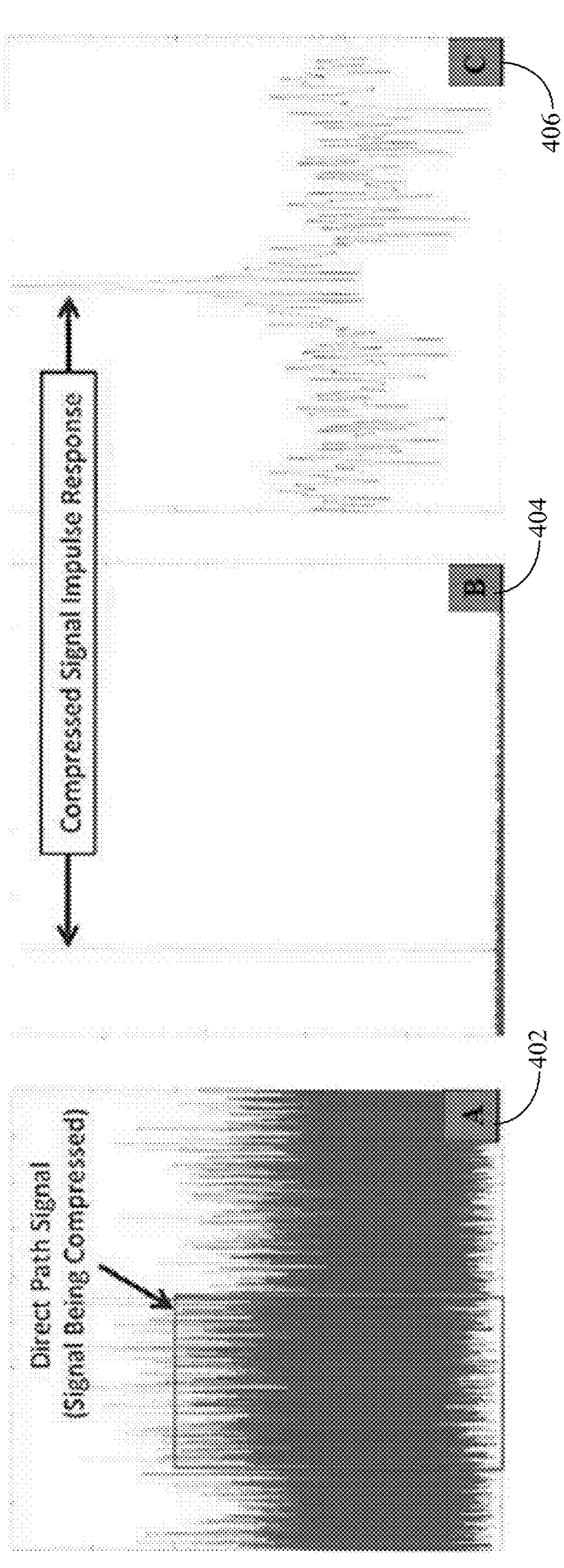
FIG. 4 shows 3 plots illustrating an example of synthetically generated direct path signal data using a LFM chirp waveform, with a bandwidth of 500 MHz, pulse width of 10 us, an RF center frequency of 9.5 GHz, and noise level equal to the signal level (SNR~0 dB) in accordance with an embodiment of the present disclosure.

FIG. 4 shows 3 plots illustrating an example of synthetically generated direct path signal data using a LFM chirp waveform, with a bandwidth of 500 MHz, pulse width of 10 us, an RF center frequency of 9.5 GHz, and noise level equal to the signal level (SNR~0 dB) in accordance with an embodiment of the present disclosure. In FIG. 4, the first plot 402 shows raw samples for the simulated direct path signal. For example, in FIG. 4, the first plot 402 shows the amplitude of the raw sampled data that was digitally downconverted to baseband and shows that the uncompressed direct signal pulse is barely discernable. In FIG. 4, the second plot 404 shows the resulting pulse compressed data. For example, in FIG. 4, the second plot 404 shows the results of the direct path signal that has been pulse compressed with the idealized representation as the match filter reference. In FIG. 4, the third plot 406 shows the range samples around the peak showing the impulse response. For example, in FIG. 4, the third plot 406 shows the response centered on the peak. These results show that the direct path signal would be detectable (-15 dB compressed SNR for this example) even at low uncompressed SNR using the idealized representation as the reference when noise is the only contribution to the error in the knowledge of the waveform.

Figure 5:
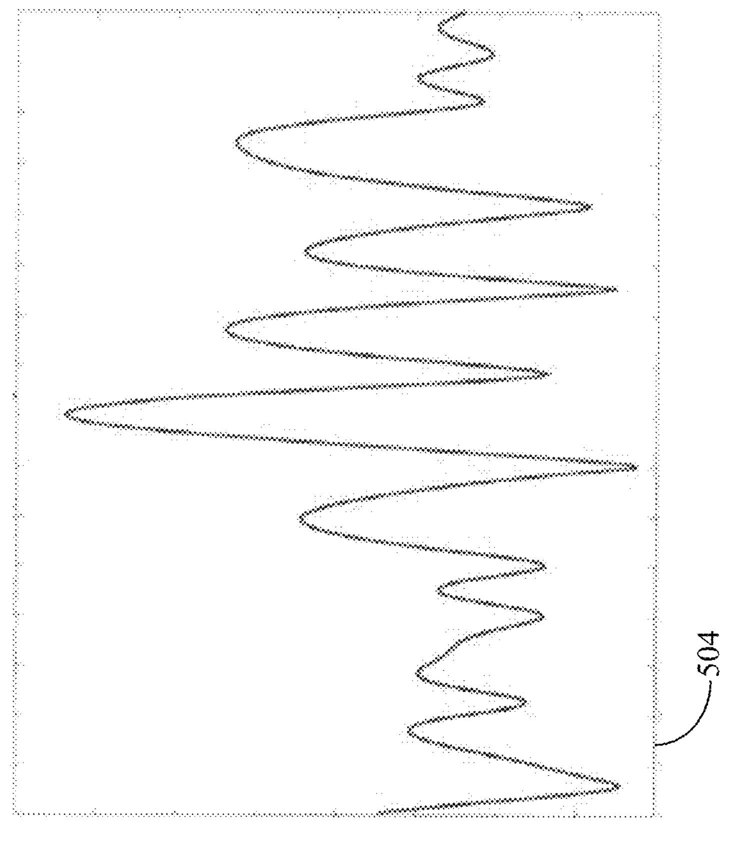
FIG. 5 shows diagrams illustrating an example that uses direct path data collected with a multi-channel synthetic aperture radar (MSAR) system as the transmitter and the idealized representation used as the reference in accordance with an embodiment of the present disclosure.
Figure 5:
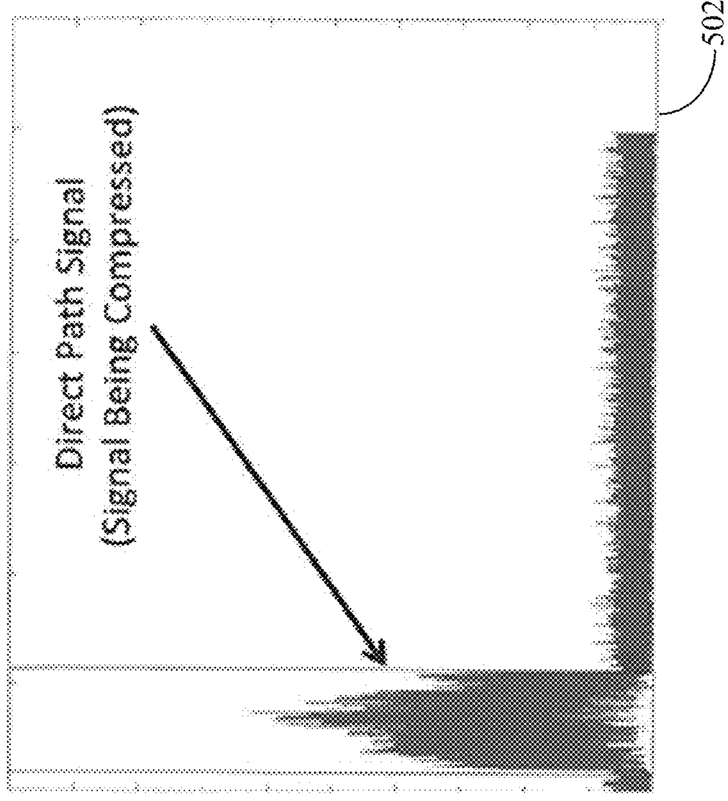

However if we consider the case where noise, system response, and propagation contribute to errors in the knowledge of the waveform, the idealized representation can perform quite poorly. FIG. 5 shows diagrams illustrating an example that uses direct path data collected with a multichannel synthetic aperture radar (MSAR) system as the transmitter and the idealized representation used as the reference in accordance with an embodiment of the present disclosure. In FIG. 5, the first plot 502 shows measured MSAR data for the direct path signal. For example, in FIG. 5, the first plot 502 shows the amplitude of the raw sampled data that was digitally downconverted to baseband and shows significant amplitude modulation in the signal. In FIG. 5, the second plot 504 shows the impulse response for the pulse compression result using the idealized reference. For example, in FIG. 5, the second plot 504 shows is the result of the direct path signal that has been pulse compressed with the idealized representation as the match filter reference and shows that there is no clear dominant correlation peak in the compressed data. This indicates that the idealized reference is not well matched to the received direct path signal and in this case the ratio of the maximum peak to other peaks is less than the uncompressed SNR of the received signal.

3.3. Spectral Shaped Idealized Representation

In an embodiment, the matched filter reference in a spectral shaped idealized representation case starts with the idealized representation and then shapes the spectrum to match the spectrum of the received direct path signal. In an embodiment, in this case, the average spectral density of the direct path signal is estimated using measurements either taken a-priori or from the bistatic receiver as part of a calibration step. The spectral density from an individual transmission can be given as:

$$s_T(f) = \left| \int s_T(t) e^{-j2\pi f t} dt \right| \tag{36}$$

where $s_T(t)$ is the measured transmitted signal. For sampled data this can be computed by taking the element-by-element absolute value of the fast Fourier transform of $s_T(t)$. To reduce the effects of noise, the spectral density can be estimated over a number of pulses, and an average spectral density can be calculated as given by:

$$\hat{S}_T(f) = \frac{1}{N} \Sigma_{n=1}^{N} \left| \int s_{T,n}(t) e^{-j2\pi f t} dt \right| \tag{37}$$

where $s_{T,n}$ is the measured transmitted signal for pulse n. In an embodiment, the reference spectrum is formed by the Hadamard product (element wise product) of the spectrum of the idealized reference ($w_1(f)$) and the estimated measured spectral density. This can be given by:

$$w(f) = \hat{S}_T(f) \circ w_1(f) = [\hat{S}_T(f_1) \cdot w_1(f_1), \hat{S}_T(f_2) \cdot w_1(f_2), \ldots, \hat{S}_T(f_N) \cdot w_1(f_N)] \tag{38}$$

and $$w_I(f) = \int w_I(t) e^{-j2\pi f t} dt \tag{39}$$

where $w_1(t)$ is the time domain idealized reference function. The time domain reference function can be determined using:

$$w(t) = \int w(f) e^{fj2\pi f t} df \tag{40}$$

An advantage of this approach over the idealized reference is that it can account for changes in the waveform due to noise, system frequency response, other non-linear effects that can modulate the waveform, or propagation effects. A disadvantage is that if the waveform spectrum of the transmitted waveform changes over time or if a different system is used as the transmitter, the mismatch in the spectrum can cause degradation in the pulse compression performance.

Figure 6:
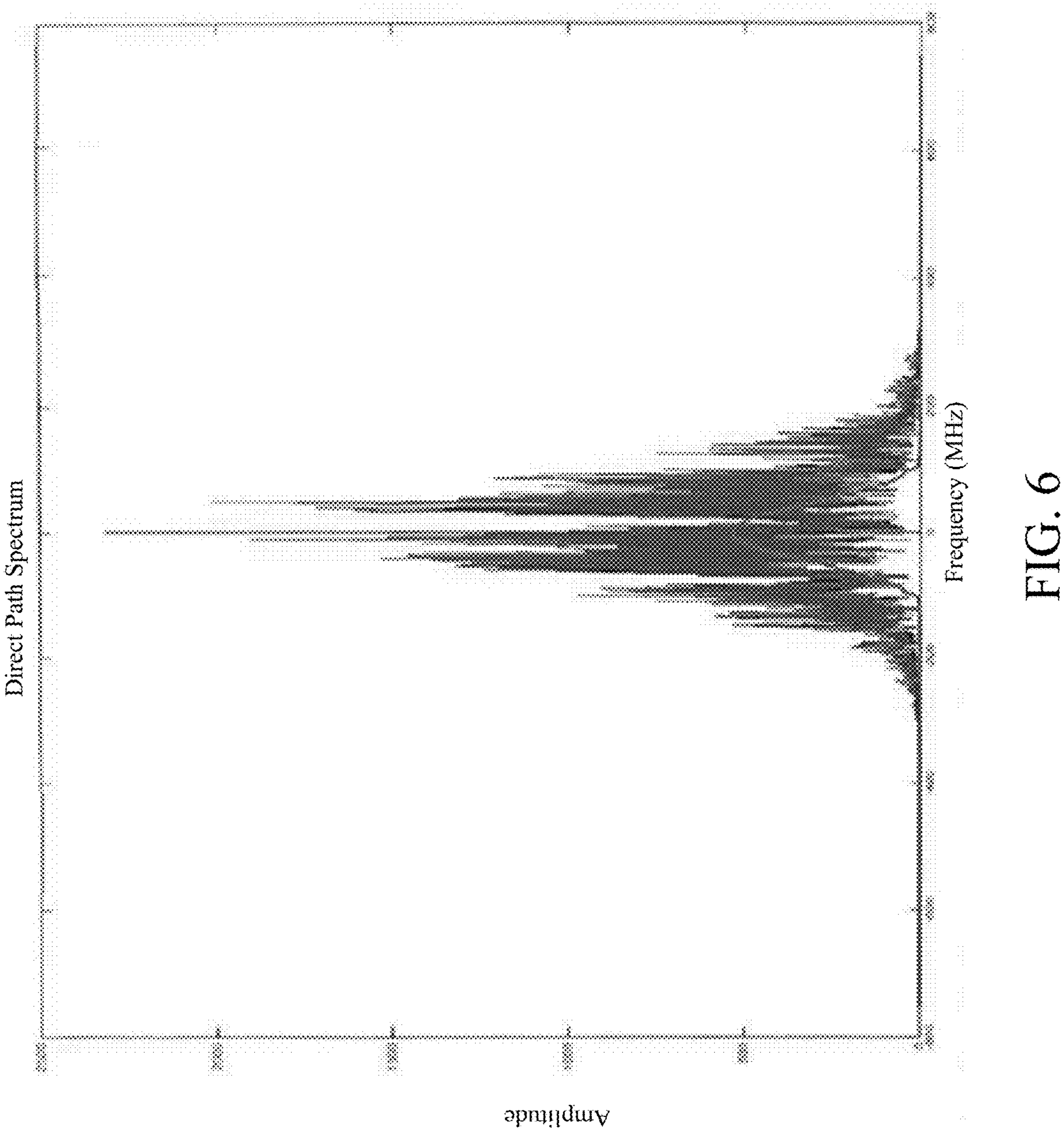
FIG. 6 shows a diagram illustrating a measured direct path instantaneous and average spectrum used for spectral shaping of the idealized reference in accordance with an embodiment of the present disclosure.

FIG. 6 shows a diagram illustrating a measured direct path instantaneous and average spectrum used for spectral shaping of the idealized reference in accordance with an embodiment of the present disclosure. The example of FIG. 6 uses direct path data collected with the MSAR system as the transmitter and the spectral shaped idealized representation used as the reference. The direct path signal was detected and extracted for 1000 pulses, the instantaneous spectral density was generated for each pulse, average spectral density was computed, and the result is shown in FIG. 6. The measured average spectral density was used to modify the spectrum of the idealized reference that was used in the previous example, and a new matched filter reference was generated.

Figure 7:
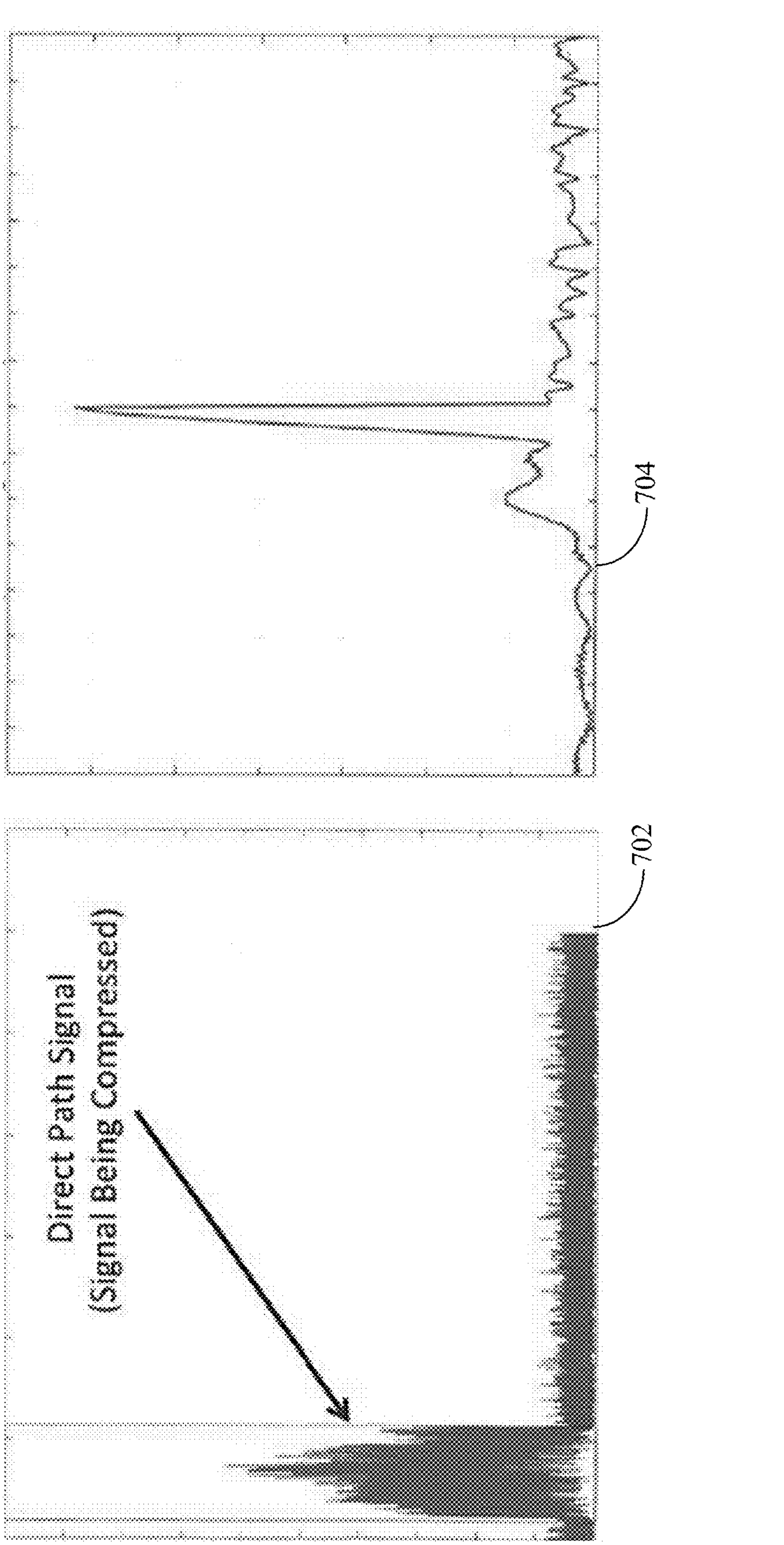
FIG. 7 shows diagrams illustrating the amplitude of the raw sampled data that was digitally downconverted to baseband, which is the same data used for the idealized reference example, in accordance with an embodiment of the present disclosure.

FIG. 7 shows diagrams illustrating the amplitude of the raw sampled data that was digitally downconverted to baseband, which is the same data used for the idealized reference example, in accordance with an embodiment of the present disclosure. In FIG. 7, the first plot 702 shows measured MSAR data for the direct path signal. In FIG. 7, the second plot 704 shows the impulse response for the pulse compression result using the spectrally shaped idealized reference. For example, in FIG. 7, the second plot shows the result of the direct path signal that has been pulse compressed with the new reference, wherein the result shows that the direct path signal is detectable in the pulse compressed data. At first, using the spectrally shaped idealized reference appears to be a good choice for the pulse compression reference signal; however, if we look at the results using the direct path signal from a pulse transmitted at a later time, the results are very different.

Figure 8:
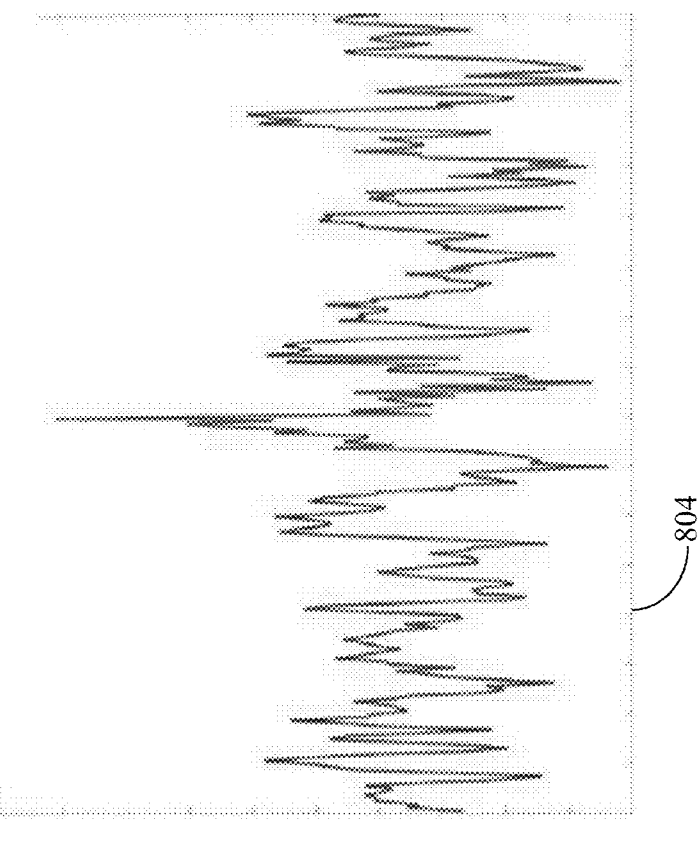
FIG. 8 shows diagrams illustrating the raw data and the pulse compression results from the same data collection but from a pulse transmitted about a quarter of a second later than the previous example in accordance with an embodiment of the present disclosure.
Figure 8:
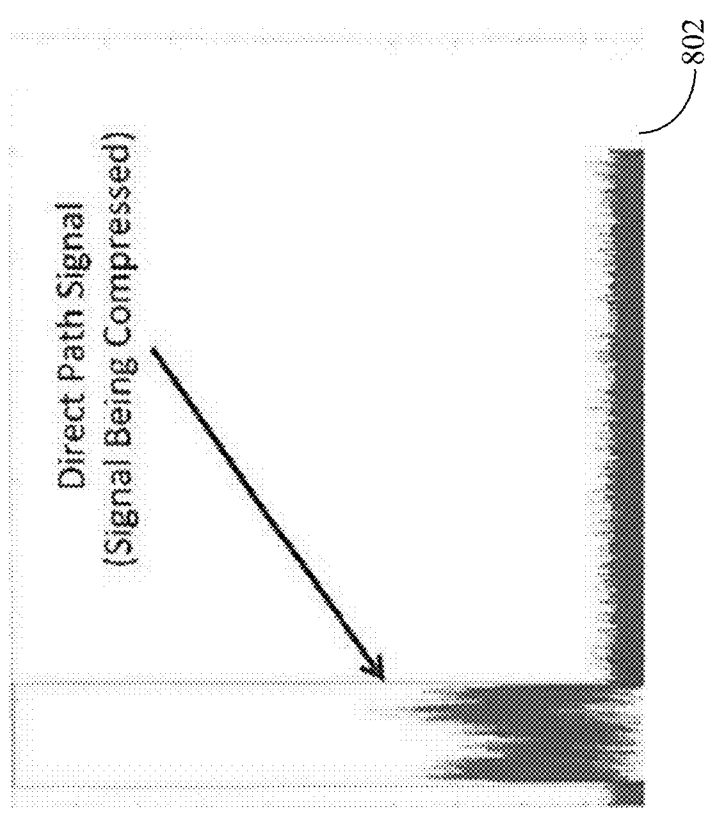

FIG. 8 shows diagrams illustrating the raw data and the pulse compression results from the same data collection but from a pulse transmitted about a quarter of a second later than the previous example in accordance with an embodiment of the present disclosure. In FIG. 8, the first plot 802 shows measured MSAR data for the direct path signal. In FIG. 8, the second plot 804 shows the impulse response for the pulse compression result using the spectrally shaped idealized reference a quarter of a second after the direct path spectrum was estimated. In this case the results are still better than using the idealized reference but not as good as the previous example. This variation over time not only affects the performance of the synchronization but can produce artifacts in the compressed target data and degrade the resulting ISAR image.

3.4. Direct Path Signal Reference

In an embodiment, the matched filter reference in a direct path signal reference case uses the measured direct path signal that is extracted from the receiver's signal stream from the previous pulse. The pulse compression in this case is analogous to a cross correlation with the previous direct path signal and can be represented by:

$$s_{PC,n}(t) = s_n(t) \otimes s_{D,n-1}(t) = \int s_n(\tau) S_{D,n-1}(\tau - t) d\tau \tag{41}$$

where $s_{PC,n}(t)$ is the pulse compressed signal for pulse n, $s_n(t)$ is the uncompressed received signal for pulse n, and $s_{D,n-1}(t)$ is the extracted direct path signal for n−1.

Figure 9:
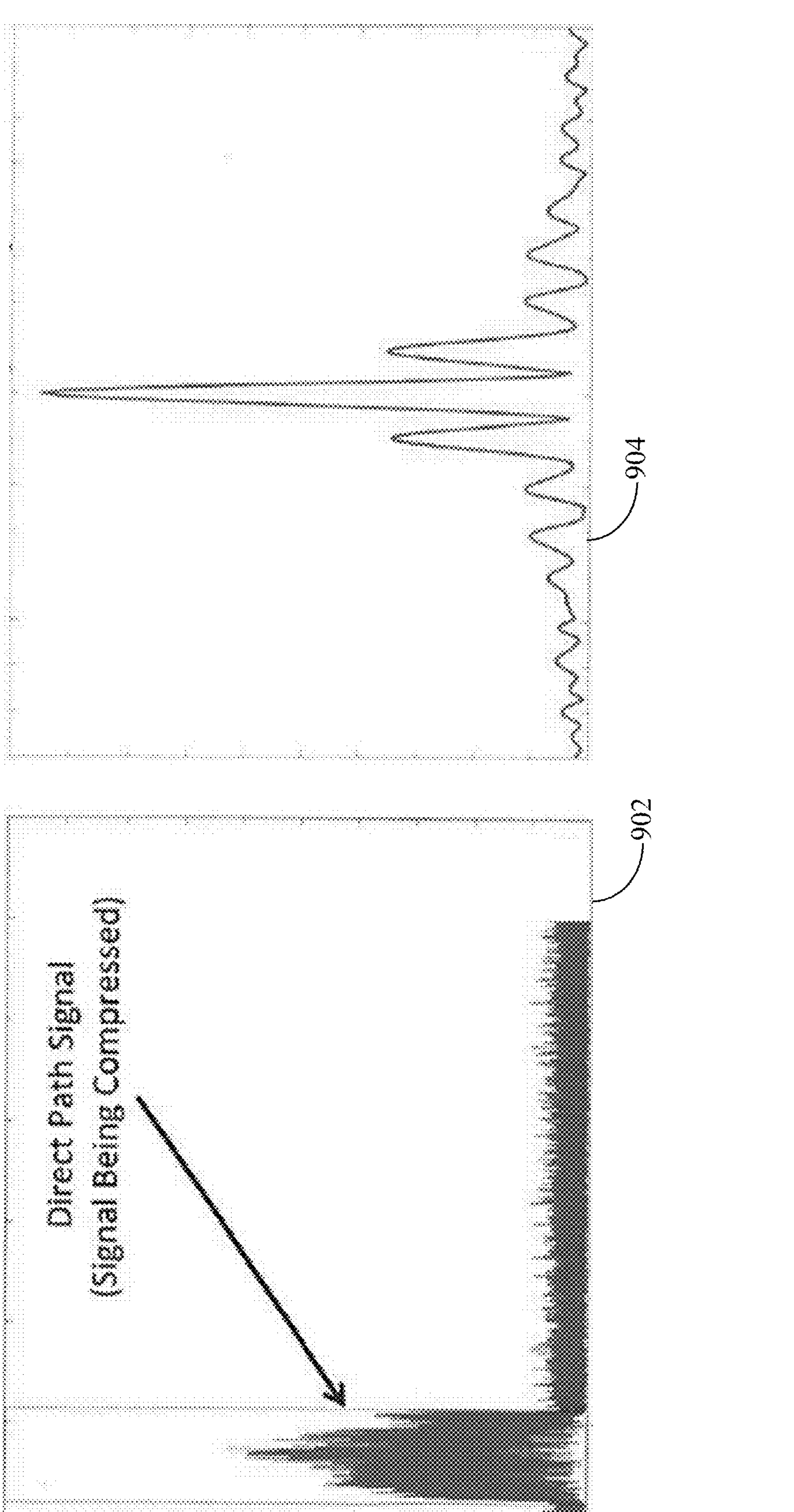
FIG. 9 shows diagrams illustrating a direct path signal reference example that uses direct path data collected with the MSAR system as the transmitter and the direct path signal extracted from the previous pulse as the reference in accordance with an embodiment of the present disclosure.

FIG. 9 shows diagrams illustrating a direct path signal reference example that uses direct path data collected with the MSAR system as the transmitter and the direct path signal extracted from the previous pulse as the reference in accordance with an embodiment of the present disclosure. In FIG. 9, the first plot 902 shows measured MSAR data for the direct path signal. For example, in FIG. 9, the first plot 902 shows the amplitude of the raw sampled data that was digitally downconverted to baseband and is the same data used for the previous two examples. In FIG. 9, the second plot 904 shows the impulse response for the pulse compression using the extracted direct path signal as reference. For example, in FIG. 9, the second plot 904 is the result of the direct path signal that has been pulse compressed with the reference generated from the previous direct path signal, and the result shows that the direct path signal is detectable in the pulse compressed data. Even though there are sidelobes evident in the pulse compressed response when using the direct path signal as the reference, testing has shown that the response is stable over time and provides the best performance for the data collected using the MSAR system as the transmitter. Performance with other systems can yield different results, so an optimum selection of reference can depend on the system used for the transmitter.

3.5. Matched Filter Processing Method

In an embodiment, the process for performing the matched filtering is as important as the selection of techniques used to perform the matched filtering (pulse compression). In an embodiment, two options for matched filtering are performing a cross-correlation on the real sampled Intermediate Frequency (IF) data with the equivalent real sampled IF reference signal (referred to as correlation in the following discussion) and performing a full pulse compression process (referred to as pulse compression in the following discussion), which involves digital down-conversion to baseband followed by a frequency domain cross-correlation with the equivalent reference signal. In an embodiment, the correlation is the standard time-domain correlation (e.g., xcorr function in Matlab®) and can be given by:

$$s_C(t) = \int s_R^*(\tau) s(\tau + t) d\tau \tag{42}$$

where $s_V(t)$ is the conjugate of the matched filter reference and $s(\tau+t)$ is the input signal to the matched filtering process. Note that in this case, where $s_R(\tau)$ is real-valued, $$s_R^*(\tau) = s_R(\tau).$$

In an embodiment, the first step in performing the full pulse compression process is to down-convert both the signal and the reference to baseband. In an embodiment, because this is being done digitally, the down-conversion can be implemented as a single-sideband down-conversion as given by:

$$s_B(t) = s_{IF}(t) e^{-j2\pi f_{IF} t} \tag{43}$$

where $S_{IF}(t)$ is the signal data at IF, $S_B(t)$ is the baseband signal data, and $f_{IF}$ is the receiver's IF frequency. In an embodiment, when the reference that is used is based on an idealized representation, the down-conversion step for the reference is not necessary because it can be formed directly at baseband. In an embodiment, since the match filtering process for pulse compression occurs in the frequency domain, the Fourier transform for both the reference and signal is computed:

$$s_R(f)=\mathcal{F}\{s_R(t)\} \tag{44}$$

$$s_B(f)=\mathcal{F}\{s_B(t)\} \tag{45}$$

where $\mathcal{F}$ {} represents the Fourier Transform. In an embodiment, the next step is to multiply the spectrum of the signal with the complex conjugate of the spectrum of the reference, which produces the spectrum of the match filtered (pulse compressed) signal.

$$s_{PC}(f)=s_R'(f)\cdot s_B(f) \tag{46}$$

In an embodiment, the time domain match filtered signal is the inverse Fourier transform of the match-filtered spectrum.

$$s_{PC}(t)=\mathcal{F}^{-1}\{s_{PC}(f)\} \tag{47}$$

Figure 10:
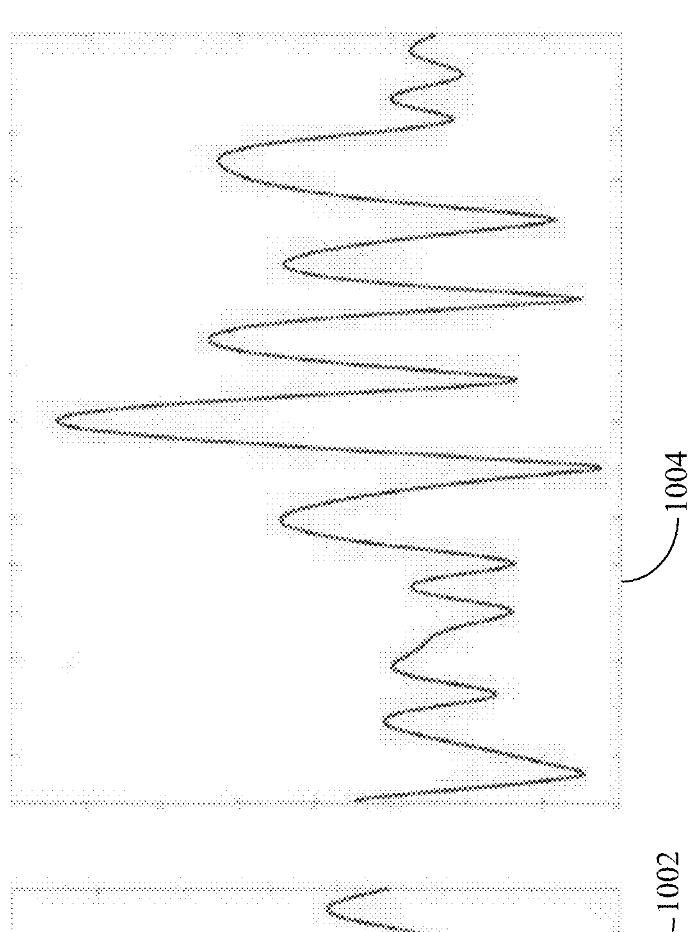
FIG. 10 shows diagrams illustrating the comparison between correlation processing and pulse compression processing when the idealized representation is used as the matched filter reference in accordance with an embodiment of the present disclosure.
Figure 10:

In an embodiment, to evaluate the performance of each these approaches, the same MSAR measured data that was used to evaluate the selection of matched filter reference can be used. FIG. 10 shows diagrams illustrating the comparison between correlation processing and pulse compression processing when the idealized representation is used as the matched filter reference in accordance with an embodiment of the present disclosure. In FIG. 10, the first plot 1002 shows an impulse response for matched filtering using correlation processing. In FIG. 10, the second plot 1004 shows an impulse response for matched filtering using pulse compression processing using the idealized reference. The results show that the correlation processing has some oscillations, likely caused by a mixing product of the reference IF signal and a DC bias component in the measurement, that are mitigated when the pulse compression processing is done (matched filtering done at baseband).

Figure 11:
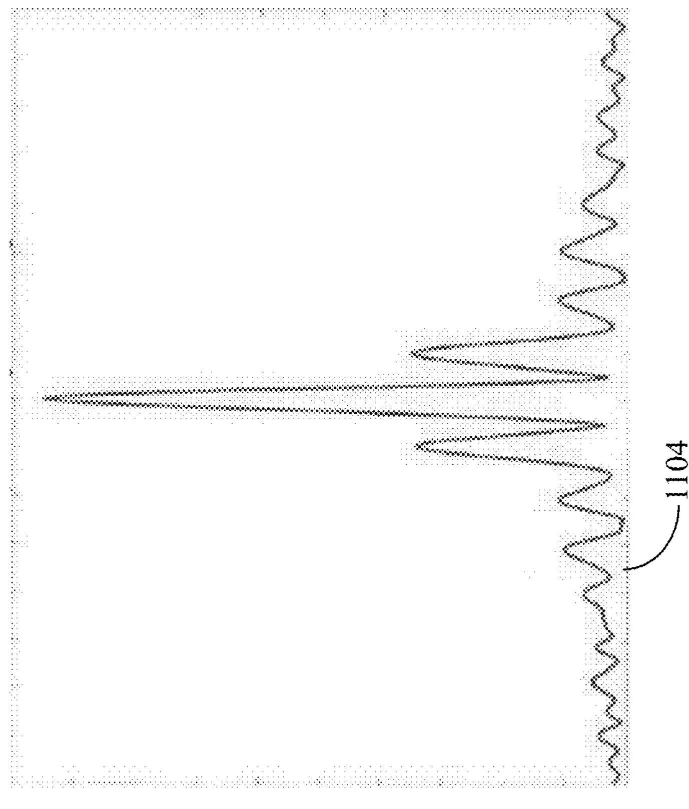
FIG. 11 shows diagrams illustrating the comparison between correlation processing and pulse compression processing when the extracted direct path signal is used as the matched filter reference in accordance with an embodiment of the present disclosure.
Figure 11:
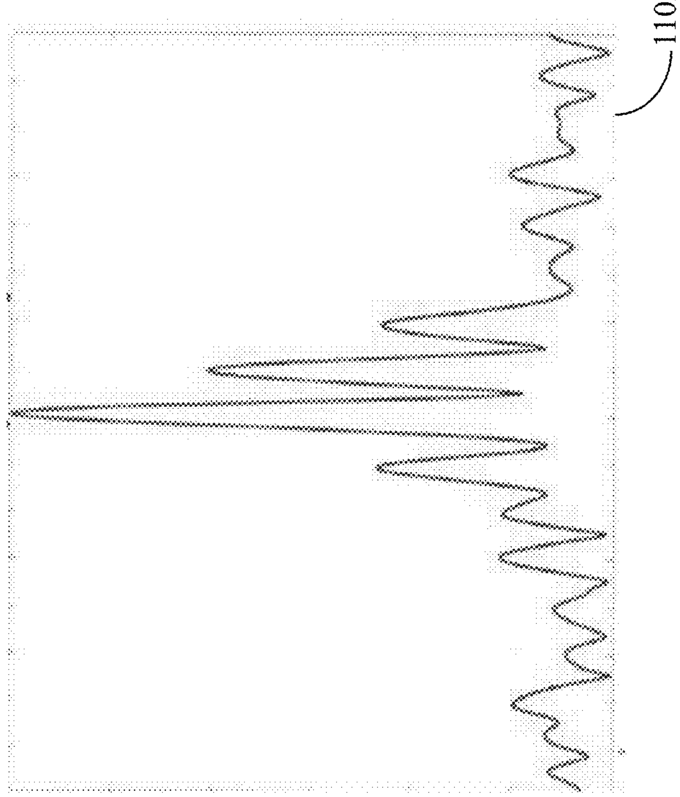

FIG. 11 shows diagrams illustrating the comparison between correlation processing and pulse compression processing when the extracted direct path signal is used as the matched filter reference in accordance with an embodiment of the present disclosure. In FIG. 11, the first plot 1102 shows an impulse response for matched filtering using correlation processing. In FIG. 11, the second plot 1104 shows an impulse response for matched filtering using pulse compression processing using an extracted direct path signal as reference. In this case, we do not observe the oscillation that was present when using the idealized reference, but the range-time sidelobes for correlation processing are higher than for pulse compression processing.

In an embodiment, both of these examples are typical of the results observed when processing the MSAR data and indicate that using the pulse compression, as the matched filtering process, is a good choice. In an embodiment, implementing the matched filtering at baseband with complex-valued data that take into account both phase and amplitude performs significantly better than the real-valued correlation done with data at IF frequencies.

4. Exemplary Synchronization Process

Figure 12:
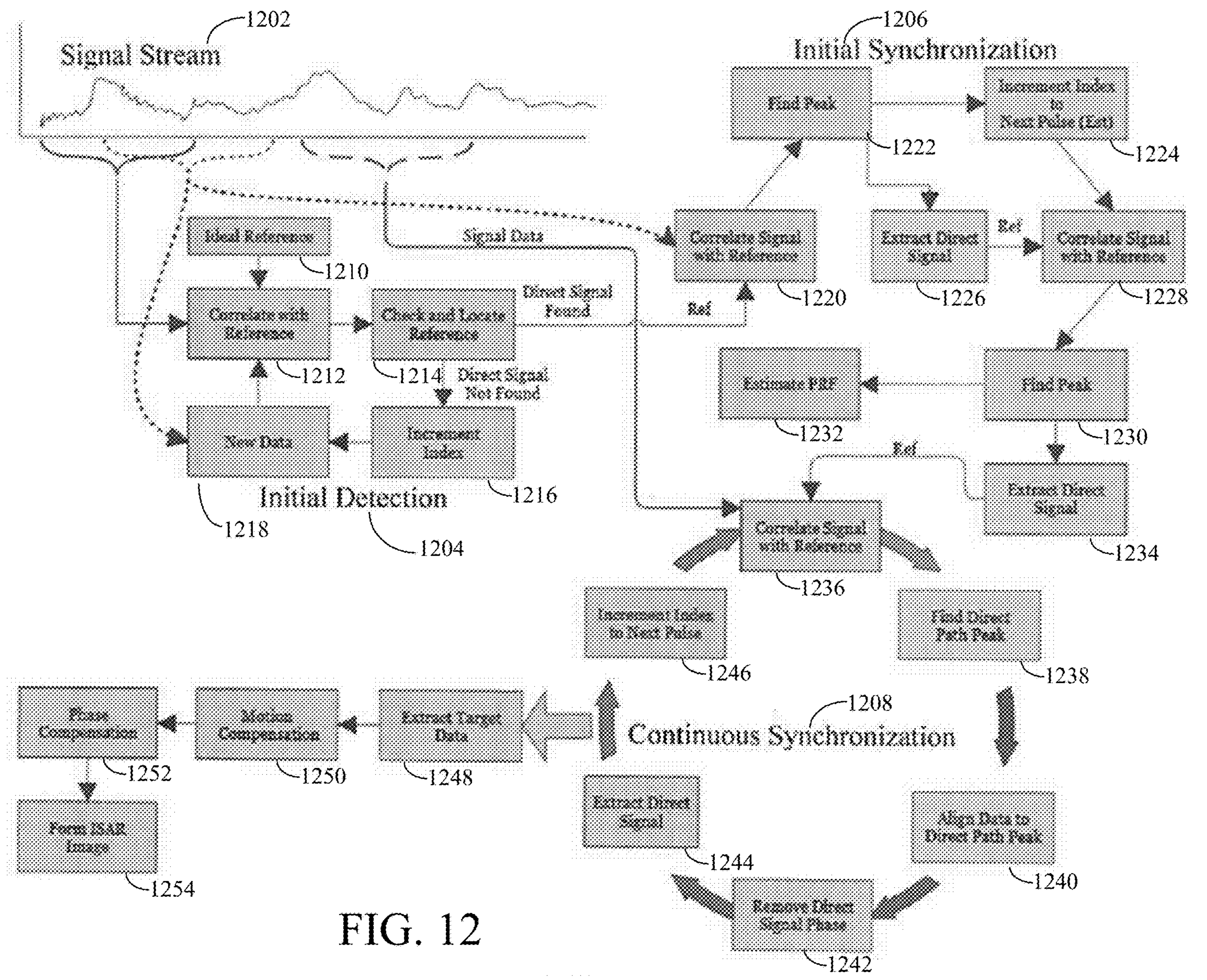
FIG. 12 shows a block diagram for an exemplary method for continuously maintaining synchronization during bistatic operation in accordance with an embodiment of the present disclosure.

In an embodiment, once the selection of matched filter reference and match filter implementation has been made, a process for continuously maintaining synchronization during bistatic operation can be developed. In an embodiment, an implementation can be broken into three stages: initial detection; initial synchronization; and continuous synchronization. In an embodiment, the initial detection stage is responsible for detecting the first direct path signal, which initiates the synchronization process. In an embodiment, the initial synchronization stage uses the initial detection to refine the extraction of the direct path signal used as the matched filter reference, to detect the direct path signal for the next pulse to estimate the PRF, and to set up the initial direct path signal location in the data stream for the continuous synchronization process. In an embodiment, the continuous synchronization stage uses the direct path reference from the previous pulse to compress the data for the current pulse, align the data, and extract and send target data to the image formation process. FIG. 12 shows a block diagram for an exemplary method for continuously maintaining synchronization during bistatic operation in accordance with an embodiment of the present disclosure. As shown in FIG. 12, an exemplary method for continuously maintaining synchronization during bistatic operation includes initial detection 1204 of a signal 1202, initial synchronization 1206, and continuous synchronization 1208. These steps will be explained in more detail below.

4.1 Initial Detection

In an embodiment, the initial detection process is used to search the signal stream from the bistatic receiver for the presence of a direct path signal. In an embodiment, the initial detection process uses data from overlapping windows that scan through the signal stream and perform the matched filtering process. In an embodiment, the result can be examined to determine if an impulse (indicative of a direct path signal) is present. In an example, the window size was four times the pulse length of the transmitted waveform, and the window was moved the pulse length for each iteration. In an embodiment, the detection criteria that was used in this example was a signal-to-noise (SNR) threshold.

In an embodiment, the noise level can be set by averaging the intensity of the match filtered signal stream over a period of time equal to two pulses. In an embodiment, the match filtering uses the idealized reference using correlation at baseband (a modified version of the correlation method presented earlier). In an embodiment, if there is a direct path signal present, this will increase the estimation of the noise level, so an additional step where any signals above a threshold set by the original noise level can be eliminated for the average calculation. In an embodiment, this provides a more accurate noise level estimation. In an embodiment, a threshold is set based on the estimated noise level and the specified SNR, and the first matched filter response that exceeds the threshold is declared a direct path signal detection. In an embodiment, once this happens the processing moves on to the initial synchronization stage.

For example, in FIG. 12, a signal 1202 is correlated 1212 with an ideal reference 1210, and then a step of checking and locating the reference 1214 is performed. In an embodiment, if a direct signal is found, the method proceeds to step 1220 of the initial synchronization stage 1206. In an embodiment, if a direct signal is not found, the index is incremented 1216, resulting in new data 1218, and the method returns to the correlation step 1212 with the new data 1218.

4.2 Initial Synchronization

In an embodiment, once the initial detection process has located a direct path signal in the data stream, that signal can be used as the matched filtering reference. However, in an embodiment, since the performance of the matched filtering using the idealized reference is sub-optimal, there may be errors in the estimated location of the direct path signal. In an embodiment, an additional iterative process to improve the estimated location of the direct path signal can be added to address this issue. In an embodiment, the data window used to extract the direct path signal is initially expanded to ensure that the entire signal is captured, and the expanded data is used as matched filter reference. In an embodiment, the peak in the matched filter response is used to refine the location of the direct path signal, the data extraction window is shrunk, and the process is repeated. Once the data extraction window is the size of the pulse width of the transmitted waveform, this iterative process ends.

In an embodiment, after the direct path location refinement has occurred, we have an accurate location of the direct path signal in the data stream and a good direct path signal that can be used for matched filtering. In an embodiment, the data surrounding the expected location (based on the expected Pulse Repetition Frequency (PRF)) of the direct path signal for the next pulse is match filtered with the known good direct path reference, and the location of the peak response is found. Based on the difference in the location of the direct path signal for two adjacent pulses in the signal stream, an estimate of the true PRF can be determined. The refined direct path signal location and the PRF estimate can used by the continuous synchronization stage.

For example, in FIG. 12, once the direct signal is found, the signal can be correlated 1220 with the reference. Next, in FIG. 12, a peak is found 1222, the direct signal is extracted 1226, and the index is incremented to the next pulse 1224. In FIG. 12, the signal is correlated 1228 with the reference, and a peak is found 1230. In FIG. 12, PRF is estimated 1232, the direct signal is extracted 1234, and the method proceeds to step 1236 of the continuous synchronization stage 1208.

4.3 Continuous Synchronization

In an embodiment, the continuous synchronization stage is the "running" mode of the synchronization processing and of the whole bistatic imaging process. In this stage the location of the direct path signal and the signal itself are used to determine the estimated location of the direct path signal and as the matched filter reference for the current pulse. In an embodiment, data starts just prior to the expected location of the direct path signal and extends to either past the expected end of the direct path signal or past the maximum location of any expected targets. In an embodiment, the amount of data used before and after the expected location of the direct path signal or targets are configurable parameters. In an example of the synchronization process, the data starts 4000 samples before the expected location of the direct path signal and extends to the expected beginning of the next pulse.

Figure 13:
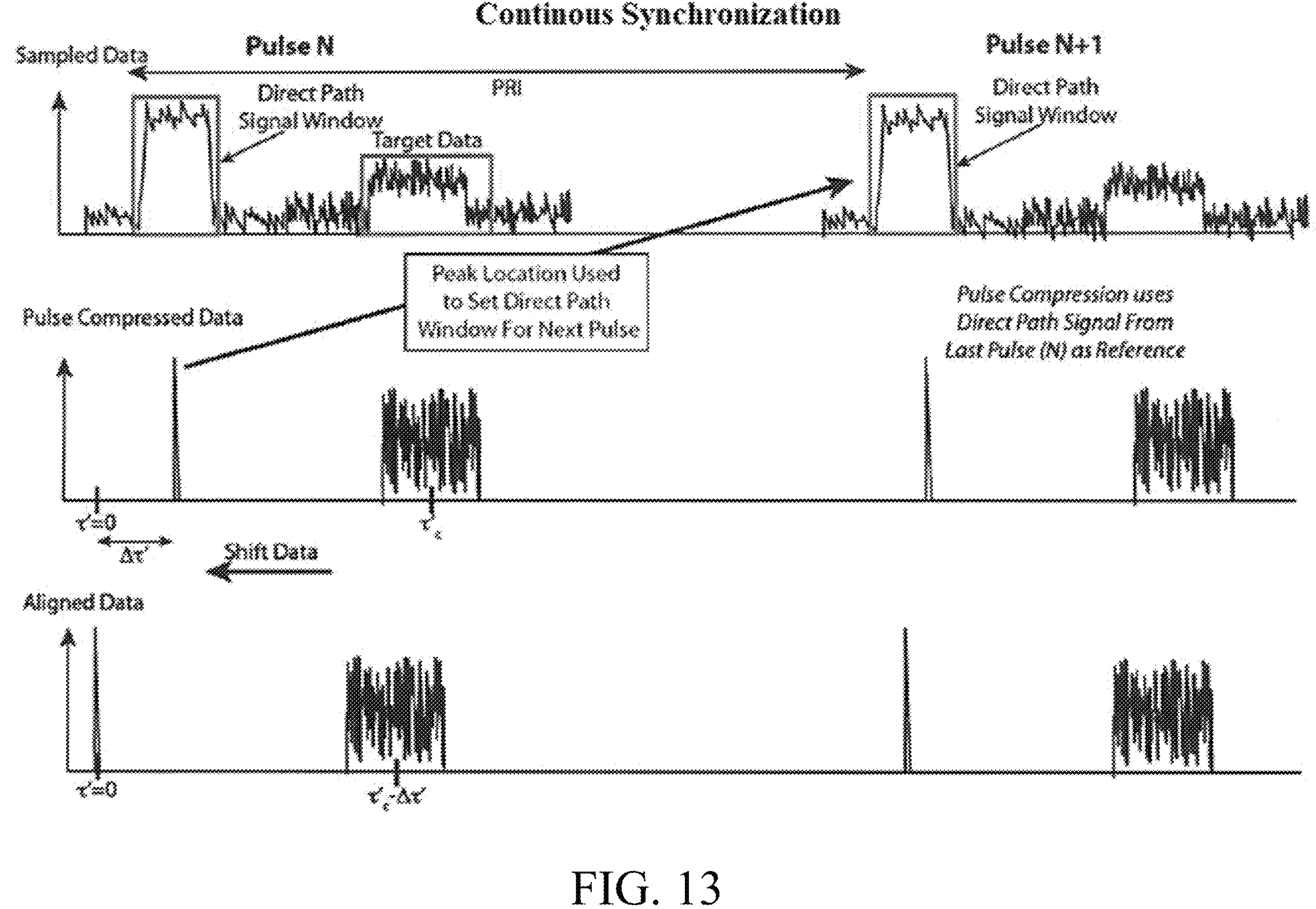
FIG. 13 is a diagram illustrating the continuous synchronization process in accordance with an embodiment of the present disclosure.

In an embodiment, this data is matched filtered using the reference from the previous pulse, and the location of the matched filter peak response for the direct path signal is located. In an embodiment, the peak should occur at the location given by the previous direct path signal location and the estimated PRF if no motion occurred. In an embodiment, if the peak does occur at a different location, the data can be shifted (including any target data) so that the peak occurs at the expected location. This is the alignment part of the process, as shown in FIG. 13. FIG. 13 is a diagram illustrating the continuous synchronization process in accordance with an embodiment of the present disclosure.

In an embodiment, the matched filter response to the direct path signal is actually a complex value and contains phase information. The phase of the peak response represents the average change in phase in the direct path signal from the previous pulse to this pulse. The phase change results from the bistatic motion and in the difference in the phase of the free-running RF oscillator determined by the arrival time of the direct path signal from pulse-to-pulse (see Equation (3)). In an embodiment, to maintain phase coherence, this change in phase can be removed from the data. This is the phase synchronization part of the process.

In an embodiment, the direct path signal is extracted and can be used as the matched filter reference for the next pulse, and the expected location of the direct path signal is projected forward using the unshifted (before alignment) direct path signal location and the PRF. In an embodiment, this loop continues until the ISAR process is stopped. In an embodiment, when enough new pulses have been synchronized to update the ISAR image, the data containing the target is extracted and sent to the ISAR range alignment, motion compensation, and image formation process.

For example, in FIG. 12, the extracted direct signal from step 1234 is correlated 1236 with the reference. In FIG. 12, the direct path peak is then found 1238, the data is aligned 1240 to the direct path peak, the direct signal phase is removed 1242, the direct signal is extracted 1244, the index is incremented 1246 to the next pulse, and the method returns to step 1236. In FIG. 12, the loop of continuous synchronization stage 1208 continues until the ISAR process is stopped. In FIG. 12, when enough new pulses have been synchronized to update the ISAR image, the data containing the target is extracted 1248 and ISAR range alignment, motion compensation 1250, phase compensation 1252, and image formation 1254 processes are performed using the data.

Figure 14:
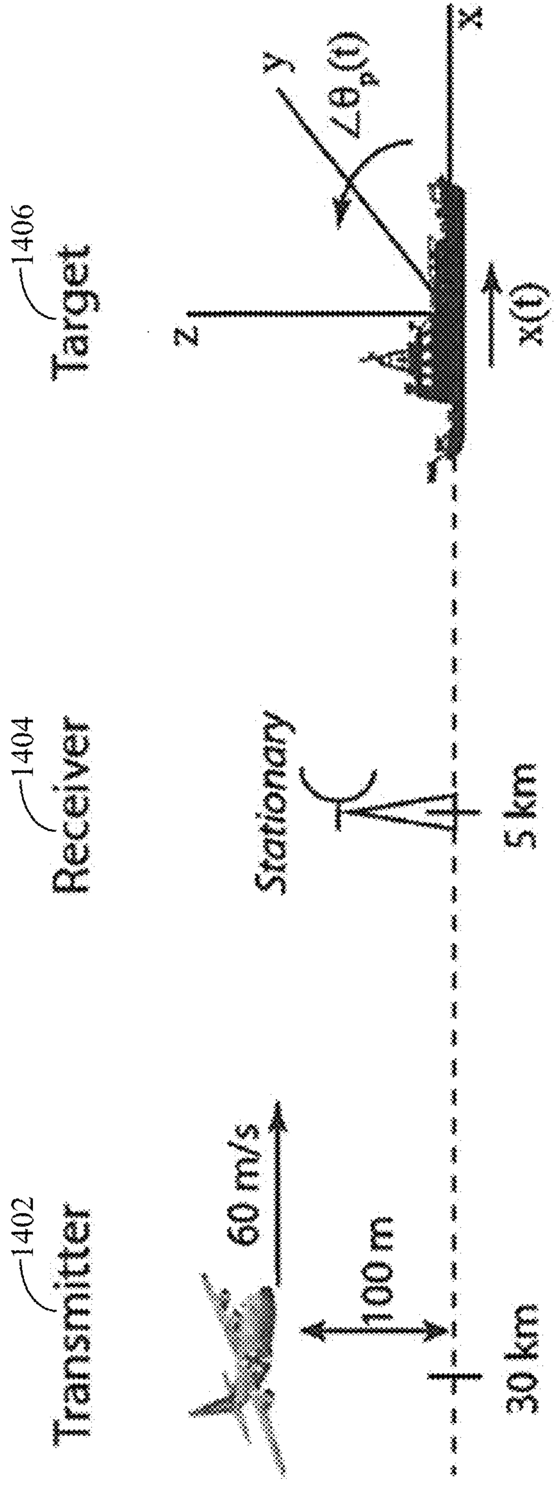
FIG. 14 is a diagram showing an exemplary geometry used for a synthetic ISAR simulation in accordance with an embodiment of the present disclosure.

FIG. 14 is a diagram showing an exemplary geometry used for a synthetic ISAR simulation in accordance with an embodiment of the present disclosure. For example, in FIG. 14, synthetic bistatic ISAR phase history data was generated using the geometry shown in FIG. 14. In FIG. 14, predefined target and platform motions are used to generate the data and therefore the actual target range shifts in the data are known. In FIG. 14, the transmitter 1402 is moving away from the target 1406 at a velocity of 60 m/s, and the receiver 1404 is stationary. In an embodiment, the model for the time varying target range shift (in meters) applied to the data can be defined as:

$$\tau(n) = \frac{M_4\delta_r}{N^4}n^4 + \frac{M_3\delta_r}{N^3}n^3 + \frac{M_2\delta_r}{N^2}n^2 + \frac{M_1\delta_r}{N}n \tag{48}$$

The parameters for this case were $M_1=-30$, $M_2=-20$, $M_3=20$, and $M_4=10$. The index n in Equation (15) is the pulse number, and $\delta_r$ is the range resolution of the radar. The target's pitch varies sinusoidally with a maximum rate of 3°/s and a period of 7 s. In an embodiment, the direct path signal was used to synchronize the synthetic data using the techniques described herein, and imagery was generated using synchronized data and unsynchronized data (data aligned using expected arrival of target signals based on the transmitter's PRF and no phase correction).

Figure 15:
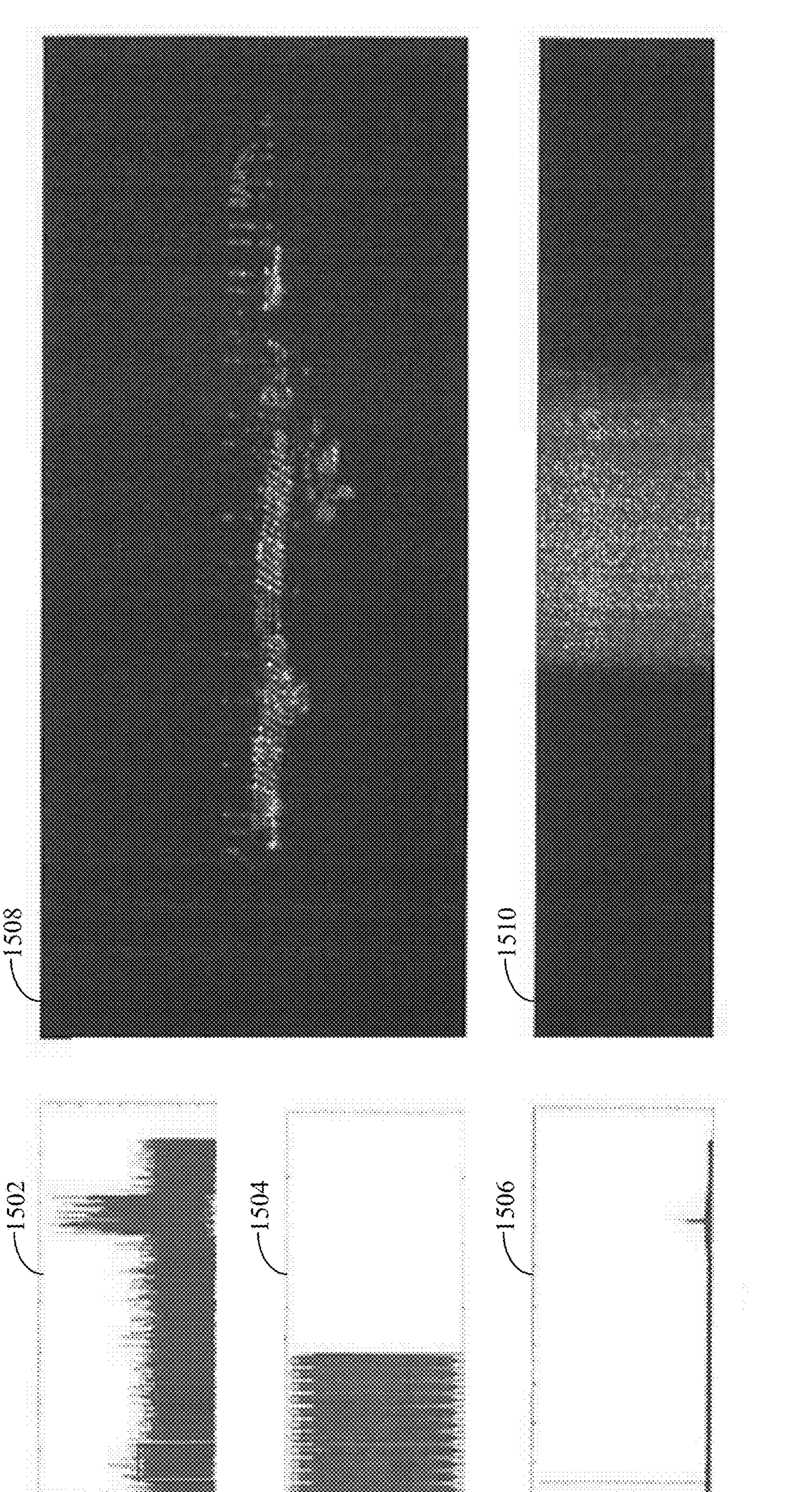
FIG. 15 shows diagrams illustrating one frame from an ISAR synchronization test demonstrating the ability to synchronized received data in accordance with an embodiment of the present disclosure.

FIG. 15 shows diagrams illustrating one frame from an ISAR synchronization test demonstrating the ability to synchronized received data in accordance with an embodiment of the present disclosure. The example of FIG. 15 was a low direct path SNR example. Specifically, FIG. 15 shows a plot of raw sample data 1502, a range offset error 1504, aligned compressed data 1506, a synchronized image 1508, and an unsynchronized image 1510. In FIG. 15, the synchronized image 1508 demonstrates that the processing was able to synchronize the data with enough coherency to be able to form an ISAR image. As can be seen in the top left plot of raw sample data 1502, the SNR in this example was very low (~0 dB), and the system was able to maintain synchronization lock on the direct path signal. In FIG. 15, the unsynchronized image 1510 formed using unsynchronized data is badly focused.

5. Exemplary Systems

Figure 16A:
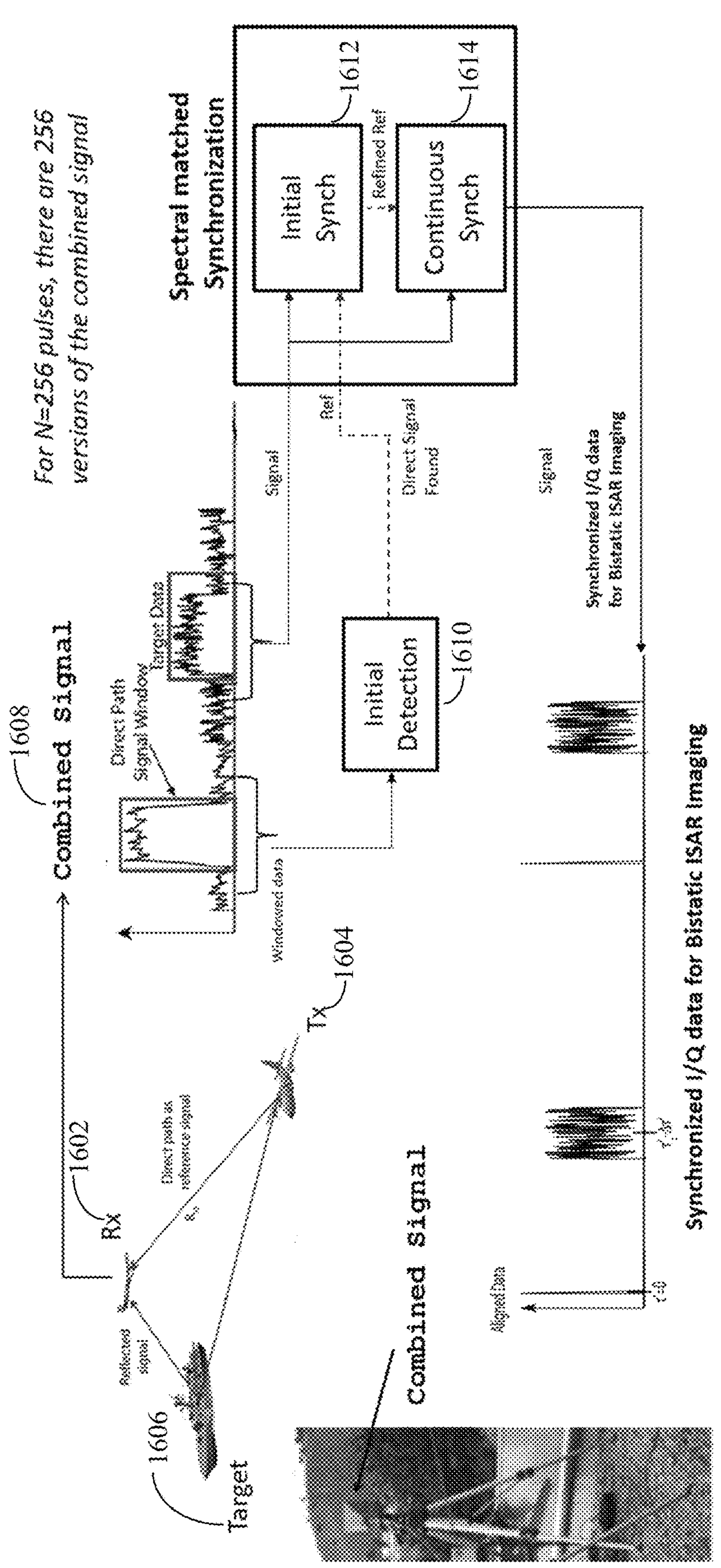
FIG. 16A shows an exemplary system diagram illustrating an embodiment of the present disclosure.

FIG. 16A shows an exemplary system diagram illustrating an embodiment of the present disclosure. FIG. 16A shows a receiver device, a transmitter device 1604, and a target device 1606. In FIG. 16A, the receiver device can determine a combined signal 1608. As described above, a process for continuously maintaining synchronization during bistatic operation can be performed (e.g., in an embodiment, by receiver device 1602). As described above, in an embodiment, this process involves initial detection 1610, initial synchronization 1612, and continuous synchronization 1614 steps.

Figure 16B:
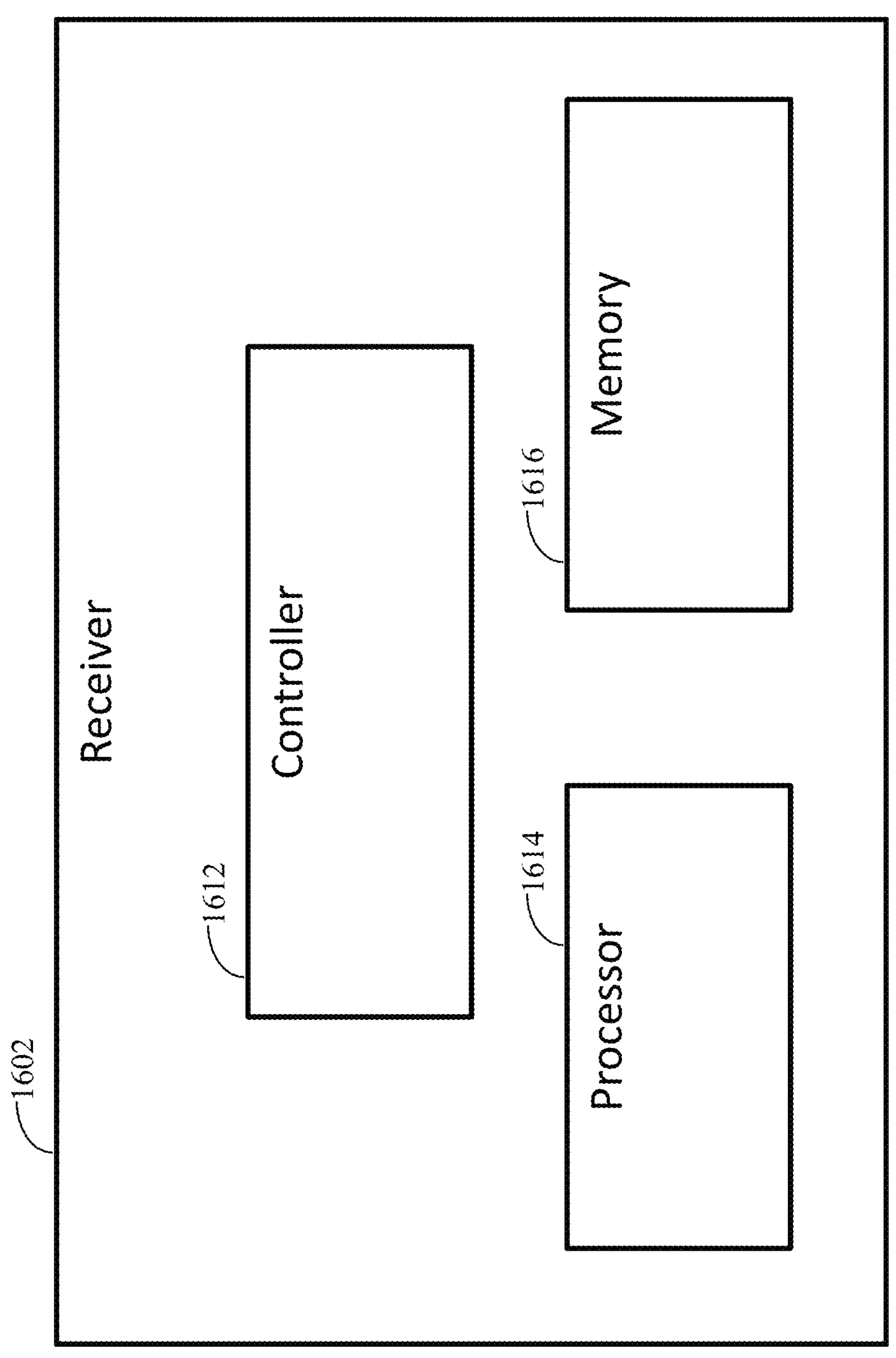
FIG. 16B shows an exemplary system diagram illustrating an exemplary receiver in accordance with an embodiment of the present disclosure.

FIG. 16B shows an exemplary system diagram illustrating an exemplary receiver in accordance with an embodiment of the present disclosure. In FIG. 16B, receiver 1602 includes a controller 1612 and optionally a processor 1614 and a memory 1616. In an embodiment, controller 1612 can perform methods in accordance with embodiments of the present disclosure. For example, in an embodiment, controller 1612 can perform a method for continuously maintaining synchronization during bistatic operation, such as that described with reference to FIG. 12. Controller 1612 can be implemented using hardware, software, and/or a combination of hardware and software in accordance with embodiments of the present disclosure. Controller can be implemented using a single device or multiple devices in accordance with embodiments of the present disclosure. In an embodiment, controller 1612 is implemented as a special purpose device. In an embodiment, controller 1612 is implemented using a general purpose computer. In an embodiment, controller 1612 is integrated into receiver 1602. In an embodiment, controller 1612 is not integrated into receiver 1602 but rather receives information from receiver 1602 and is implemented using a separate device (e.g., a separate special purpose device or a general purpose computer).

Figure 17:
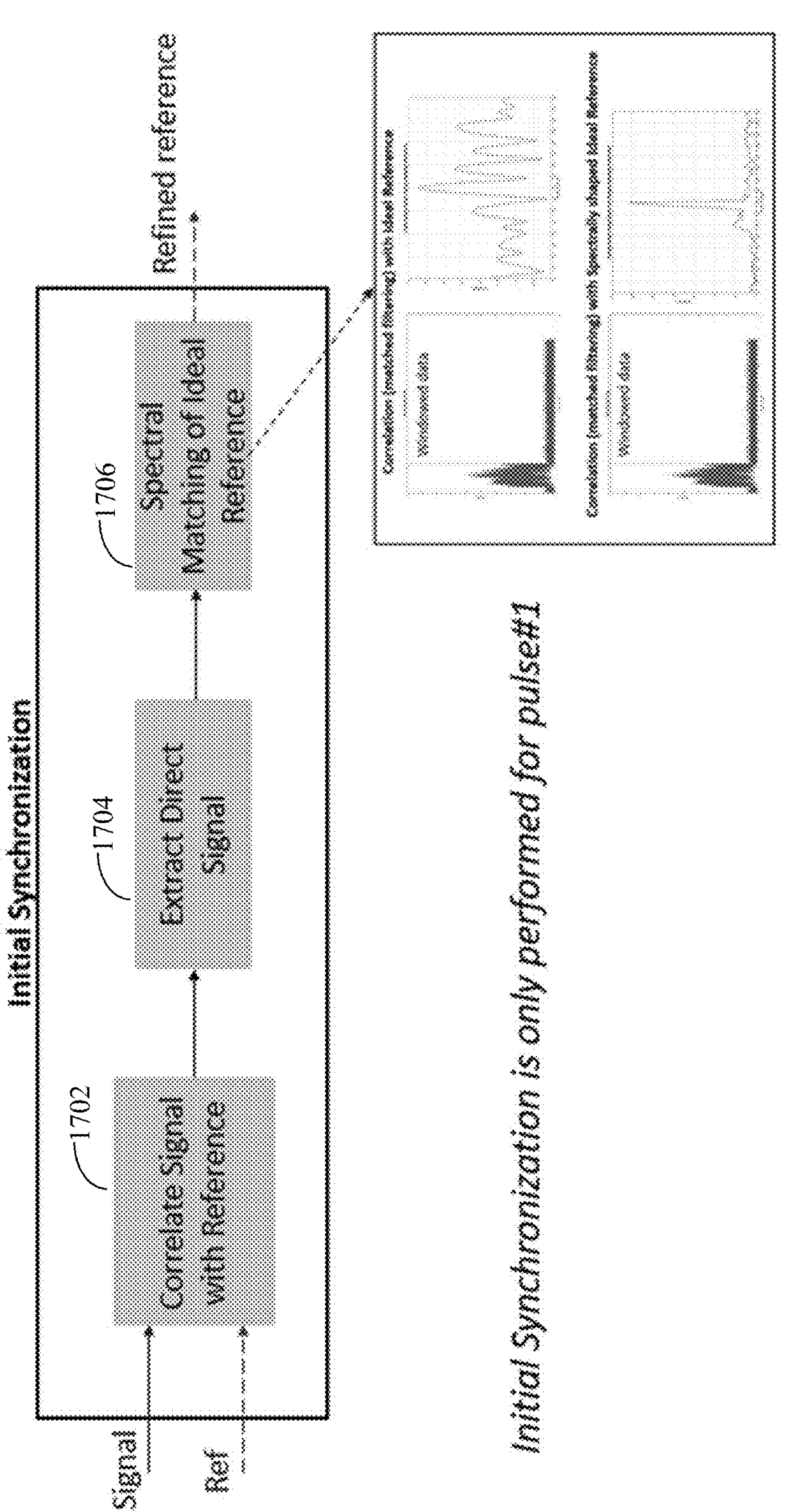
FIG. 17 is a diagram illustrating exemplary steps for initial synchronization in accordance with an embodiment of the present disclosure.

FIG. 17 is a diagram illustrating exemplary steps for initial synchronization in accordance with an embodiment of the present disclosure. As shown in FIG. 17, exemplary steps for initial synchronization in accordance with an embodiment of the present disclosure include correlating 1702 the signal with a reference, extracting 1704 the direct signal, and performing 1706 spectral matching of the ideal reference.

Figure 18:
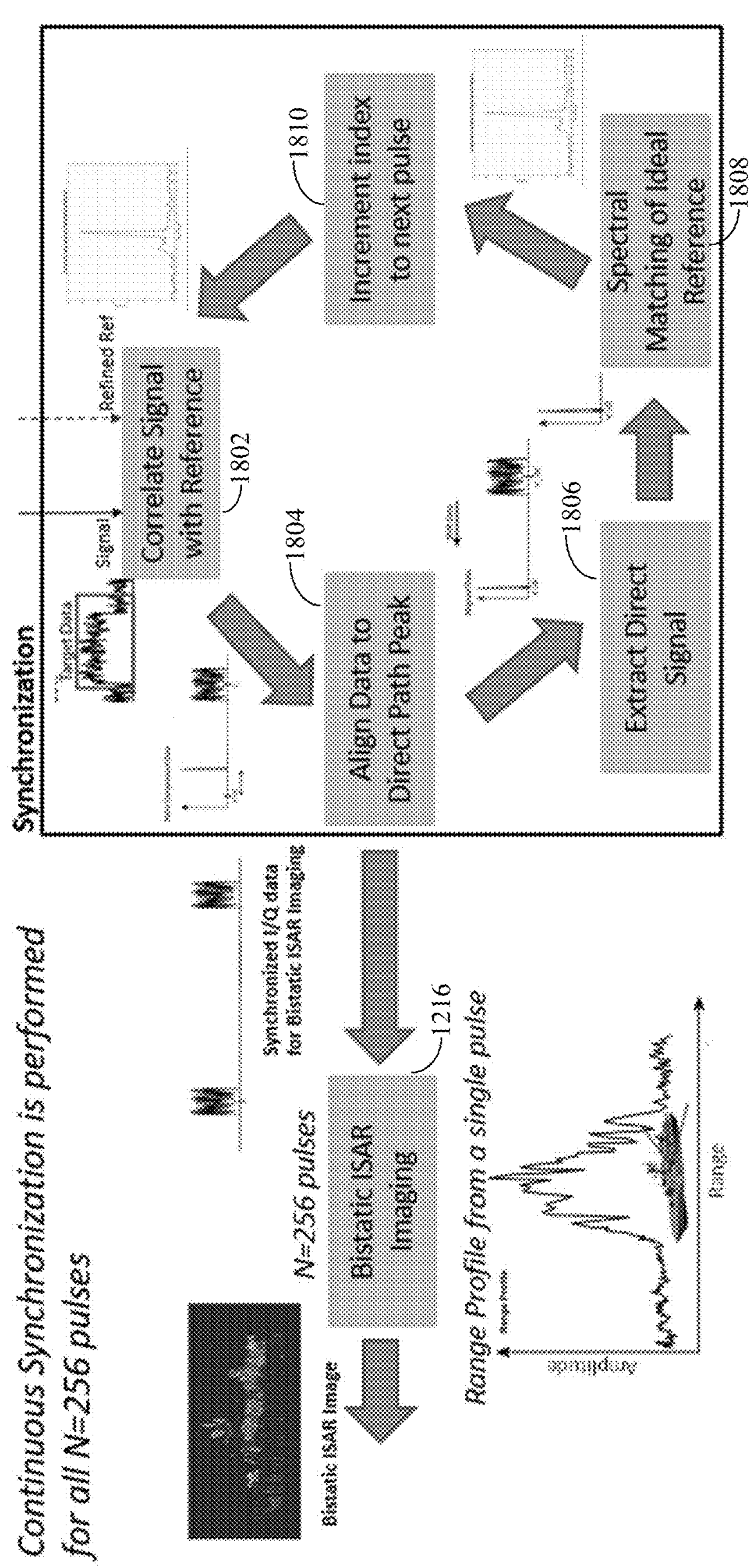
FIG. 18 is a diagram illustrating exemplary steps for continuous synchronization in accordance with an embodiment of the present disclosure.

FIG. 18 is a diagram illustrating exemplary steps for continuous synchronization in accordance with an embodiment of the present disclosure. As shown in FIG. 17, exemplary steps for continuous synchronization in accordance with an embodiment of the present disclosure include correlating 1802 the signal with the reference, aligning 1804 data to the direct path peak, extracting 1806 the direct signal, spectral matching 1808 of the ideal reference, and incrementing 1810 the index to the next pulse. In an embodiment, when enough new pulses have been synchronized to update the ISAR image, the data containing the target is extracted and bistatic ISAR imaging 1216 is performed using the data.

Figure 19:
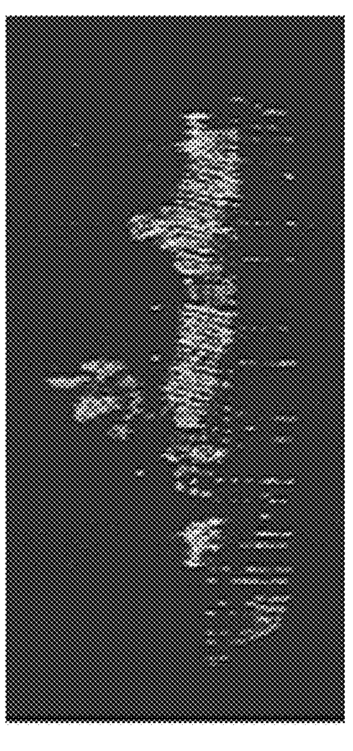
FIG. 19 shows two diagrams illustrating exemplary bistatic ISAR imaging without synchronization and exemplary bistatic ISAR imaging with synchronization in accordance with an embodiment of the present disclosure.
Figure 19:
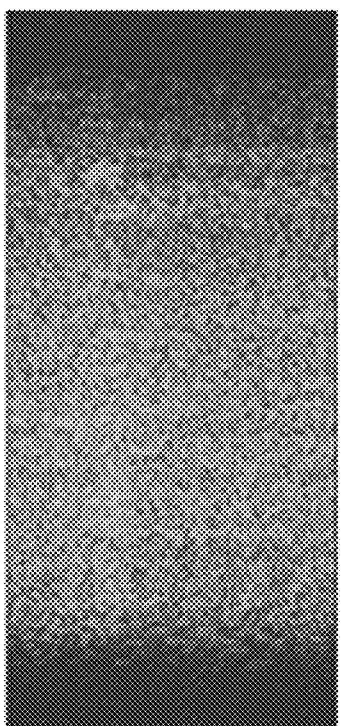

FIG. 19 shows two diagrams illustrating exemplary bistatic ISAR imaging without synchronization and exemplary bistatic ISAR imaging with synchronization in accordance with an embodiment of the present disclosure.

Embodiments of the present disclosure enable synchronization of a bistatic signal without a dedicated direct path antenna. As discussed above, embodiments of the present disclosure can use initial detection, initial synchronization, and continual synchronization phases of processing. Embodiments of the present disclosure can form the matched filter reference by measuring direct path signal extracted from the receiver's signal stream from the previous pulse and can shape the spectrum of the known waveform to match that of the direct path signal and use this for subsequent synchronization.

6. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A system, comprising:

a receiver configured to:

receive a reflected signal from a target, wherein the reflected signal is reflected from a transmitted signal sent by a transmitter towards the target, receive a direct path signal from the transmitter as a reference signal, and generate a combined signal based on the reflected signal and the reference signal; and a controller configured to:

receive the combined signal from the receiver, perform initial detection on the combined signal to search the signal for a direct path signal, perform initial synchronization on the direct path signal, thereby generating an extracted direct path signal, perform continuous synchronization on the extracted direct path signal, generate or update an inverse synthetic aperture radar (ISAR) image based on the performed continuous synchronization, thereby generating a synchronized signal, and form an ISAR image using the synchronized signal.

2. The system of claim 1, wherein the controller is further configured to:

extract image data representing the target from the synchronized signal; and form an ISAR image using the image data.

3. The system of claim 1, wherein the controller is further configured to:

perform range alignment on the synchronized signal.

4. The system of claim 3, wherein the controller is further configured to:

determine a change in a pulse centric arrival time of a scatterer signal from pulse-to-pulse to perform the range alignment on the synchronized signal.

5. The system of claim 1, wherein the ISAR image is a bistatic ISAR image.

6. The system of claim 1, wherein the controller is configured to form the ISAR image using the synchronized signal without requiring a dedicated direct path antenna.

7. A device, comprising:

a processor; and a memory storing instructions, that if executed by the processor, causes the processor to perform operations comprising:

receiving a reflected signal from a target, wherein the reflected signal is reflected from a transmitted signal sent by a transmitter towards the target, generating a combined signal based on the reflected signal and a reference signal, and performing initial detection on the combined signal to search the signal for a direct path signal, performing initial synchronization on the direct path signal, thereby generating an extracted direct path signal, performing continuous synchronization on the extracted direct path signal, generating or updating, using the controller device, an inverse synthetic aperture radar (ISAR) image, based on the performed continuous synchronization, thereby generating a synchronized signal, and forming an ISAR image using the synchronized signal.

8. The device of claim 7, wherein the reference signal is a direct path signal from the transmitter.

9. The device of claim 7, wherein the operations further comprise:

extracting image data representing the target from the synchronized signal; and forming an ISAR image using the image data.

10. The device of claim 7, wherein the operations further comprise:

performing range alignment on the synchronized signal.

11. The device of claim 10, wherein the operations further comprise:

determining a change in a pulse centric arrival time of a scatterer signal from pulse-to-pulse to perform the range alignment on the synchronized signal.

12. The device of claim 7, wherein the ISAR image is a bistatic ISAR image.

13. The device of claim 7, wherein forming the ISAR image comprises forming the ISAR image without requiring a dedicated direct path antenna.

14. A system, comprising:

a transmitter configured to transmit a signal towards a target; and a receiver configured to:

receive a reflected signal from the target, wherein the reflected signal is reflected from the transmitted signal, receive a direct path signal from the transmitter as a reference signal, generate a combined signal based on the reflected signal and the reference signal, perform initial detection on the combined signal to search the signal for a direct path signal, perform initial synchronization on the direct path signal, thereby generating an extracted direct path signal, perform continuous synchronization on the extracted direct path signal, generate or update an inverse synthetic aperture radar (ISAR) image, based on the performed continuous synchronization, thereby generating a synchronized signal, and form an ISAR image using the synchronized signal.

15. The system of claim 14, wherein the receiver is further configured to:

extract image data representing the target from the synchronized signal; and form an ISAR image using the image data.

16. The system of claim 14, wherein the receiver is further configured to:

perform range alignment on the synchronized signal.

17. The system of claim 16, wherein the receiver is further configured to:

determine a change in a pulse centric arrival time of a scatterer signal from pulse-to-pulse to perform the range alignment on the synchronized signal.

18. The system of claim 17, wherein the receiver is further configured to:

correct a shift in a range profile of data in the synchronized signal to perform the range alignment on the synchronized signal.

19. The system of claim 14, wherein the ISAR image is a bistatic ISAR image.

20. The system of claim 14, wherein the controller is configured to form the ISAR image using the synchronized signal without requiring a dedicated direct path antenna.

* * * * *